United States Patent [19]

Minemura et al.

[11] Patent Number: 5,583,840
[45] Date of Patent: Dec. 10, 1996

[54] ROM TYPE OPTICAL RECORDING MEDIUM WITH A HIGH REFLECTIVITY AND AN OPTICAL HEAD OPERABLE ON ROM, WRITE-ONE AND REWRITABLE DISK

[75] Inventors: Hiroyuki Minemura; Yoshio Sato, both of Hitachi; Nobuyoshi Tsuboi, Tokai-muran; Hisashi Andoh; Masaichi Nagai, both of Hitachi; Isao Ikuta, Iwaki; Yoshimi Kato, Takahagi; Yoshihito Maeda, Mito; Tatsuya Sugita, Hitachi; Yutaka Sugita, Tokorozawa, all of Japan

[73] Assignee: Hitachi, Ltd., Tokyo, Japan

[21] Appl. No.: 365,053

[22] Filed: Dec. 28, 1994

Related U.S. Application Data

[63] Continuation of Ser. No. 620,081, Nov. 30, 1990, abandoned.

[30] Foreign Application Priority Data

Jan. 3, 1991 [JP] Japan ...................................... 1-315288

[51] Int. Cl.⁶ .......................................................... G11B 7/00
[52] U.S. Cl. ............................ 369/100; 369/283; 369/288; 369/275.2; 369/275.1
[58] Field of Search ................................. 369/100, 50, 54, 369/58, 111, 124, 225.2, 225.3, 225.4, 225.5, 283, 284, 288, 13

[56] References Cited

U.S. PATENT DOCUMENTS

| | | | |
|---|---|---|---|
| 4,586,173 | 4/1986 | Ando | 369/275.4 |
| 4,740,447 | 4/1988 | Itoh | 369/288 |
| 4,752,554 | 6/1988 | Sato et al. | 369/288 |
| 4,811,331 | 3/1989 | Gerber | 369/275.4 |
| 4,839,883 | 6/1989 | Nagata et al. | 369/100 |
| 4,841,502 | 6/1989 | Murakami et al. | 369/100 |
| 4,860,273 | 8/1989 | Sawano et al. | 369/100 |
| 4,866,688 | 9/1989 | Ohtake et al. | 369/275.4 |
| 4,879,710 | 11/1989 | Iijima | 369/283 |
| 4,965,114 | 10/1990 | Ikeda et al. | 369/288 |
| 4,984,232 | 1/1991 | Utsumi et al. | 369/275.2 |
| 5,093,174 | 3/1992 | Suzuki et al. | 369/284 |
| 5,107,482 | 4/1992 | Goto et al. | 369/100 |
| 5,116,693 | 5/1992 | Liu et al. | 369/13 |
| 5,144,618 | 9/1992 | Goto et al. | 369/275.2 |
| 5,150,339 | 9/1992 | Ueda et al. | 369/275.2 |
| 5,253,233 | 10/1993 | Fujii | 369/286 |
| 5,325,351 | 6/1994 | Uchiyama | 369/283 |

FOREIGN PATENT DOCUMENTS

| | | |
|---|---|---|
| 0198546 | 11/1984 | Japan . |
| 0336616 | 10/1989 | Japan . |
| 2005244 | 1/1990 | Japan . |
| 0420982 | 10/1991 | Japan . |

OTHER PUBLICATIONS

Knight et al "Optical Data Storage Topical Meeting" vol. 1078, 17–19 Jan. 1989, Los Angeles, California.

*Primary Examiner*—Georgia Y. Epps
*Assistant Examiner*—Kim-Kwok Chu
*Attorney, Agent, or Firm*—Antonelli, Terry, Stout & Kraus

[57] ABSTRACT

An optical information handling device in which reflectivity of the conventional reproduction-only type optical disk is lowered to 60% or less and is made equal to the reflectivity of write-once type and rewritable type optical disks, whereby interchangeability in these of these disks is possible.

36 Claims, 27 Drawing Sheets

REFLECTIVE FILM THICKNESS 30nm

REFLECTIVE FILM THICKNESS 100nm

CROSS-SECTIONAL VIEW OF A-A'

CROSS-SECTIONAL VIEW OF A-A'

- 130 SUBSTRATE
- 141 FIRST INTERFERENCE FILM
- 142 RECORDING FILM
- 143 SECOND INTERFERENCE FILM
- 144 REFLECTIVE FILM
- 145 PROTECTIVE FILM

- 130 SUBSTRATE (NON-TRANSPARENT AVAILABLE)
- 144 REFLECTIVE FILM
- 143 SECOND INTERFERENCE FILM
- 142 RECORDING FILM
- 141 FIRST INTERFERENCE FILM
- 145 PROTECTIVE FILM (CROSS SECTIONAL CONSTITUTION VIEW OF AA' IN FIG. 15)

(ENLARGED VIEW OF B-PART)

(ENLARGED VIEW OF C-PART)

CROSS-SECTIONAL VIEW OF A-A'

ROM TYPE OPTICAL RECORDING MEDIUM WITH A HIGH REFLECTIVITY AND AN OPTICAL HEAD OPERABLE ON ROM, WRITE-ONE AND REWRITABLE DISK

CROSS-REFERENCES TO RELATED APPLICATIONS

This application is a continuation of U.S. application Ser. No. 07/620,081, filed Nov. 30, 1990, now abandoned on Feb. 6, 1995.

BACKGROUND OF THE INVENTION

The present invention relates to an information processing device and an optical disk memory for use therewith, and, in particular, relates to a portable and thin type information processing device and an optical disk memory used therein.

Optical disks having a large memory capacity have been broadly used for various applications with development of our information-oriented society. The optical disk memories are classified broadly as reproduction-only type, write-once type, and rewritable type. The reproduction-only type, represented by a compact disk, records information in the form of a recess and a projection on a substrate with such devices as stampers, such that a large quantity of memory medium of inexpensive cost can be supplied. The reproduction-only type optical disk, in other words, the ROM type optical disk, is suitable for use as a memory medium for commercial software, such as game software, picture image processing software, and word processing software, because this memory element can be supplied at an inexpensive cost and in large quantity, and additionally has the ability to maintain a high reliability of the recorded information regardless of heat and external magnetic fields. On the other hand, the write-once type and rewritable type optical disks record information through pit formation, phase change, or magnetization reversal, which is caused by heating recording materials of thin film with laser beam irradiation, and there is an increasing demand for use of such devices as large capacity memory devices for private use, such as document files and picture image files. However, in the above-mentioned reproduction-only type optical memory, a metallic film, such as aluminum or gold, is formed on the substrate to a thickness where the transmitting light almost disappears, due to a high reflectivity of more than 75%. On the other hand, the write-once type and rewritable type optical memories have a requirement to increase their absorptivities to as large an extent as possible for effectively utilizing the heat energy of the irradiated laser beam, with the result that the reflectivity of these devices is as low as about 15 to 30%. Therefore, it has been difficult to use the same optical disk device for both the reproduction-only type disk and the write-once and rewritable type optical disks in common. In addition, a low rank optical disk device designed for the reproduction-only type disk can not read information recorded on the optical disk of the write-once type and rewritable type.

Conventionally, in some write-once type and rewritable type optical disks, a ROM part was formed on a part of the disk, such as through pre-pit formation. However, the ROM part of these disks was provided with basically the same disk structure as that of the write-once and rewritable part so as to maintain the reflectivity constant and hold down production costs. Further, this disk was provided with a film including recording materials. Namely, the optical characteristics of recording materials in the ROM part of the conventional write-once type and rewritable type optical disks was subject to change, such as by temperature, external magnetic fields, and irradiation of the recording beam caused by erroneous operation of the optical disk device, with the possible loss of recorded information and the creation of reproduction error due to such loss of information and reduction of information quality. A ROM type optical disk with which the present invention deals has a film constitution including no recording material, such as provided on a compact disk and a laser disk, and pertains to a reproduction-only type optical disk having a high reliability with regard to recorded information, and is different from the ROM part in the conventional write-once type and rewritable type optical disks.

On the other hand, there has been a demand for a thinner type optical disk medium for use with a lap top computer and a portable optical disk device. Conventionally, an example of a thin, card size optical disk memory is disclosed in JP-A-60-79581 (1985), wherein a disk type optical memory medium is rotatably mounted in a case of credit card size for facilitating handling. Moreover, by emitting a laser beam through a transparent opening portion of the case, the case can serve as a part of a transparent substrate having a thickness of 1.2 mm and a thin optical disk memory is realized. However, even with such a disk type optical memory medium in a card size case, no optical memory medium having compatibility between the reproduction-only type, and the write-once type and rewritable types, and no optical memory system capable of using the same interchangeably have been realized.

As explained above, realization of compatibility between the optical disk devices of the reproduction-only type, and the write-once type and rewritable type was conventionally difficult due to the reflectivity difference of the optical disks. Especially, because the compatibility in a low rank device was not realized, information in a write-once type and rewritable type optical disk could not be reproduced with a reproduction-only type optical disk device.

Further, while an optical disk as an exchangeable memory medium has a large memory capacity, its package is large in comparison with such memory elements as a floppy-disk and an IC card, with the result that its thickness must be reduced if it is to be used as a memory for such devices as a lap top computer and other portable information processing devices.

SUMMARY OF THE INVENTION

An object of the present invention is to solve the above-mentioned problems, to provide an optical disk memory system having compatibility between a reproduction only type and a write-once type and rewritable type medium, as well to fulfill a demand for thickness reduction of an optical disk memory.

For achieving the above object, the present invention provides an information processing device which universally operates with ROM type, write-once type, and rewritable type optical disk memories by providing a disk reflectivity of not more than 60% for all types of disks, and comprises an optical head for recording or reproducing necessary information to and from the optical disk memory, means for accommodating one of the above-mentioned ROM type, write-once type, and rewritable type optical disk memories in a predetermined relative position with respect to the above-mentioned optical head, means for accommodating one of the above-mentioned ROM type, write-once type, and rewritable type optical disk memories in a predetermined position, rotating means for rotating the above-mentioned optical disk memory, a drive circuit for controlling motion of the above-mentioned optical head and rotational speed of the above-mentioned rotating means, a processor providing a command to the drive circuit, input means for inputting information to the processor, and output means for outputting information from the processor.

Further, the present invention provides an information processing device which comprises a ROM type optical disk memory in which a disk type optical memory medium optically recording information is rotatably mounted in a credit card size case, rotating means for rotating the above-mentioned ROM type optical disk memory, a drive circuit for controlling motion of the above-mentioned optical head and the rotational speed of the above-mentioned rotating means, a processor providing a command to the drive circuit, input means for inputting information to the processor, and output means for outputting information from the processor.

The present invention, in providing a ROM type optical disk used for the above-mentioned information processing device, provides a ROM type optical disk memory having a disk reflectivity not more than 60%, more preferably a reflectivity of 45 through 10%.

Moreover, in a ROM type optical disk memory in which a disk type optical memory medium, optically recording information, is rotatably received in a credit card size case, the present invention provides a ROM type optical disk memory characterized in that the reflectivity of the disk type optical memory medium is not more than 60%.

A specific example is as follows. A ROM type disk memory is prepared by using a reflective film having a low reflectivity such as Ni—Cr in place of Al and Au, which was used for the reflective film in the conventional reproduction-only type optical disk, and by inserting, for instance, a dielectric film between the substrate and the reflective film for reducing the disk reflectivity through interference, and rendering the reflectivity thereof the same as that of the write-once type and rewritable type optical disk so that compatibility of the disk medium is realized.

Here, the reflectivity of the optical disk is explained. In the reproduction-only type optical disk, information is recorded on the substrate in the form of recesses and projections, and the reflectivity of the recessed portion during reproduction is generally designed to be small. The reflectivity of a part where information is not recorded is determined by the film constitution of the reproduction-only type optical disk, and is almost the same reflectivity as the projection portion. In the following, unless indicated otherwise, reflectivity of a disk indicates the above-mentioned reflectivity determined by the film constitution of the optical disk.

Namely, reflectivity refers to spectro-reflectivity measured by irradiating a single wavelength beam having the same wavelength as the laser beam which is used as a light source on the incident side of the optical disk.

Next, to achieve the compatibility of reflectivity among the reproduction-only type, write-once type, and rewritable type optical disks, which is the object of the present invention, a reference value of the reflectivity is determined. In comparison with the write-once type optical disk represented by a pit formation type disk, in the rewritable type optical disk, such as a disk using a phase transition type material capable of undergoing transition between crystalline-amorphous, the setting of disk reflectivity is restricted because this disk employs a reversible state change of the recording materials. Therefore, a reference value of reflectivity is determined taking as an example an optical disk using a In—Sb—Te series crystalline-amorphous phase transition type optical recording film which is described in Proceedings of International Society for Optical Engineering (SPIE) (Vol. 1078, pp. 11–26, (1989)). FIG. 2 shows the cross-sectional structure thereof. The disk is constituted of a glass substrate/a SiN interference film (70 nm)/an In—Sb—Te recording film (30 nm)/a SiN interference film (70 nm)/an Au reflection film (100 nm).

On this optical disk, information is directly overwritten only by modulating the irradiating laser beam power, and the unerased remainder ratio at that instance is reduced to less than −40 dB. Consequently, for constructing an optical memory system having a compatibility of reflectivity between the reproduction-only type and the write-once type and rewritable type according to the present invention, it is understood that the compatibility is enabled if the reflectivity of the reproduction-only type optical disk is selected at about 47%, or about 50% in view of errors. However, the reflectivity is preferably set at 10 through 45%, especially at about 15 through 30% in consideration of such factors as the utilization efficiency of photo thermal energy. The reproduction-only type optical disk device at this instance may be one of the conventional type, and it is sufficient to increase the gain of an amplifier in the reproduction signal line in response to a decrease of the reproduced signal level which is accompanied by the disk optical reflectivity reduction.

In an optical disk memory system having compatibility between a reproduction-only type and a write-once type and rewritable type medium according to the present invention, the write-once type optical recording medium uses inorganic series materials, such as Te as the base, or organic series materials such as cyanine series and naphthaiocyanine series. Further, the rewritable type optical recording medium can use, in addition to the above-mentioned In—Sb—Te, crystalline-amorphous phase transition type recording materials such as Ge—Sb—Te series, In—Se—Tl series, In—Sb series, and Sb—Te series, or photo electromagnetic type recording materials such as Tb—Fe—Co series and Gd—Fe—Co series can be used.

Further, with a card having credit card size case in which the reproduction-only type optical disk is contained and through which a reproduction light beam is transmitted via a transparent portion on a part of the case, an optical memory medium which is thin and easy to handle is realized. Thereby, a small sized memory having memory capacity of more than 30 MB, or even of 50 MB, is realized.

The reflectivity of the conventional ROM type optical disk was more than 75% which is 2 through 3 times larger than that of the write-once type and rewritable type optical disks. Therefore, the realization of disk compatibility was difficult, and especially a reproduction only type device of low rank, could not read information recorded on write-once type and rewritable type optical disks. Thereupon, according to the present invention, by means such as use of a reflective film of low reflectivity, such as Ni—Cr instead of Al and Au which were used for the reflective film in the conventional reproduction-only type optical disk, or reducing disk reflectivity with optical interference by inserting a dielectric film between the substrate and the reflective film, the same reflectivity as the writeonce type and the rewritable type optical disks is made possible. Thereby, the compatibility of the disks is realized, and an optical memory system having a compatibility with devices of low rank is provided.

Further, by rotatably containing an optical disk of the present invention inside a credit card size case, an optical memory medium which is thin and easy to handle is realized.

DETAILED DESCRIPTION OF THE PREFERRED EMBODIMENTS

Hereinbelow, embodiments of the present invention are explained with reference to the drawings.

Reflectivity of the reproduction-only type optical disk, in other words, the ROM type optical disk, of the present invention is smaller than 75%, the reflectivity of the conventional compact disk, and is less than 60%, preferably 10 through 45%, which is necessary for maintaining compatibility of reflectivity with a write-once type and rewritable type optical disk, in particular, more preferably about 15 through 30%.

Figure 3:
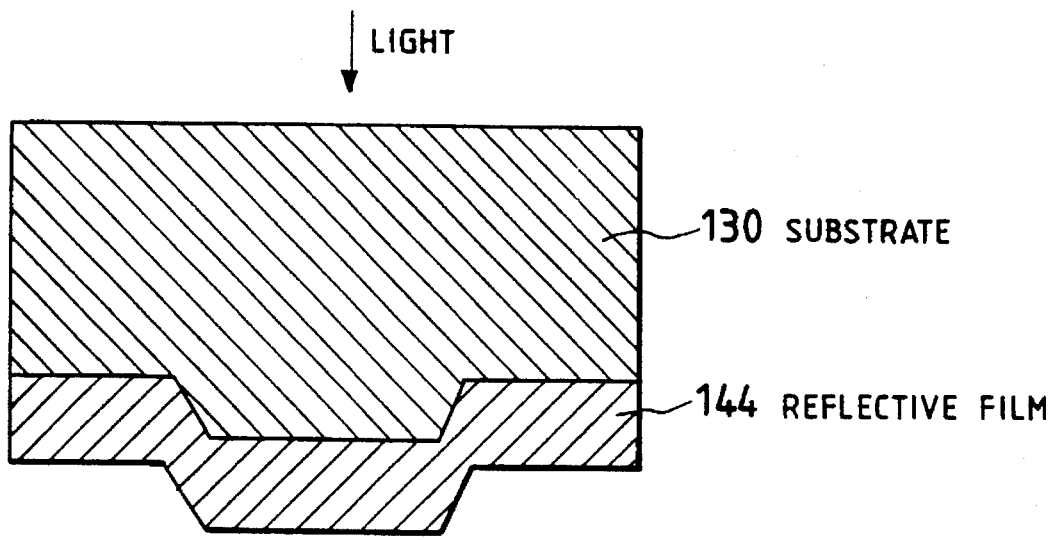
FIG. 3 and FIG. 4 are cross-sectional views showing embodiments of film constitutions in a ROM type optical disk suitable for the present invention.
Figure 4:
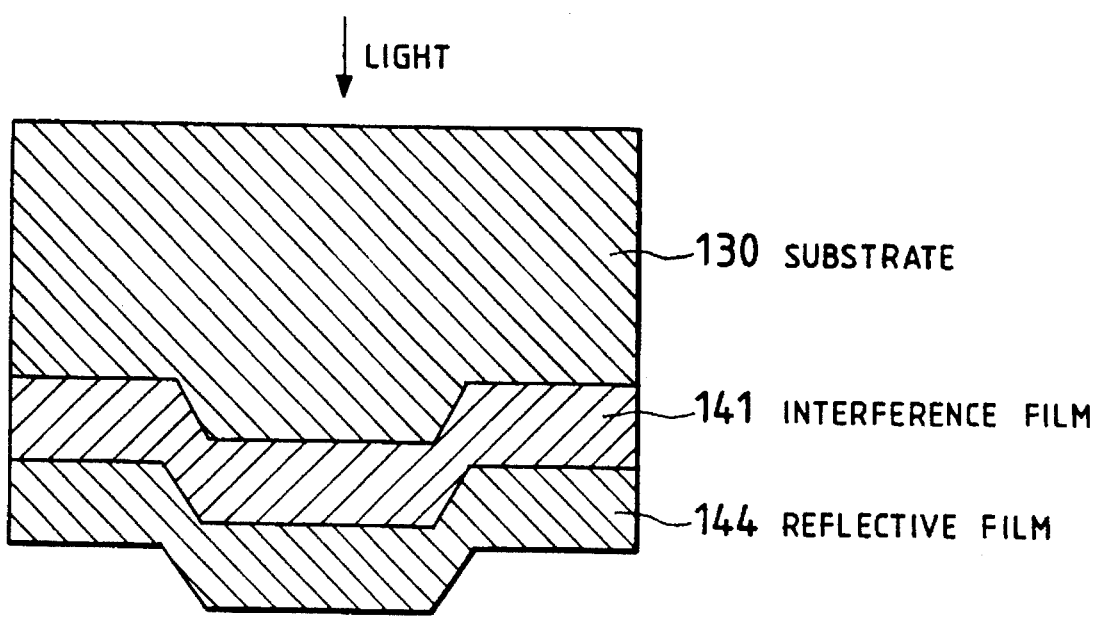
Figure 5A:
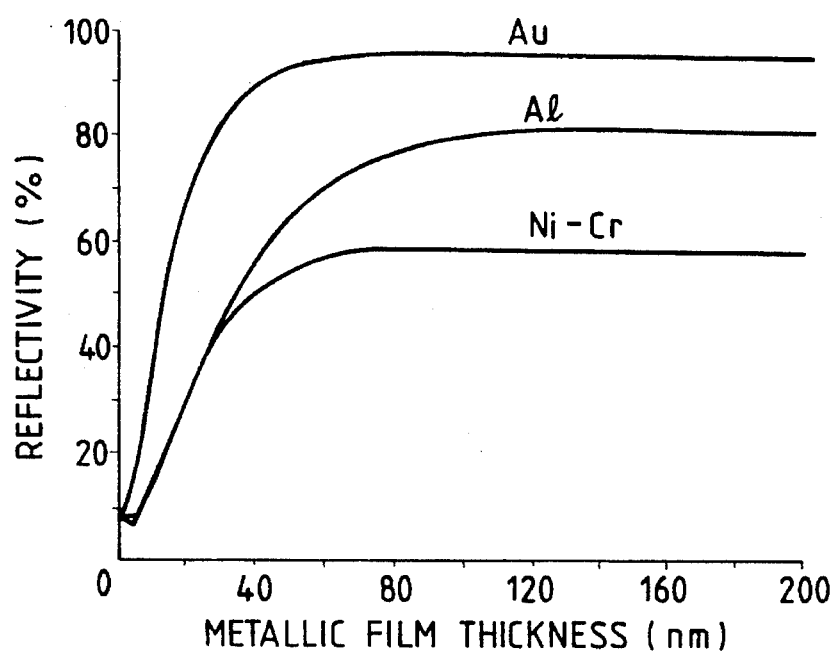
FIG. 5(a) and (b), and FIG. 6(a) and (b) are graphs showing relations between reflectivity and film constitutions of disks with a metallic film in embodiments of optical designs in a ROM type optical disk suitable for the present invention.
Figure 5B:
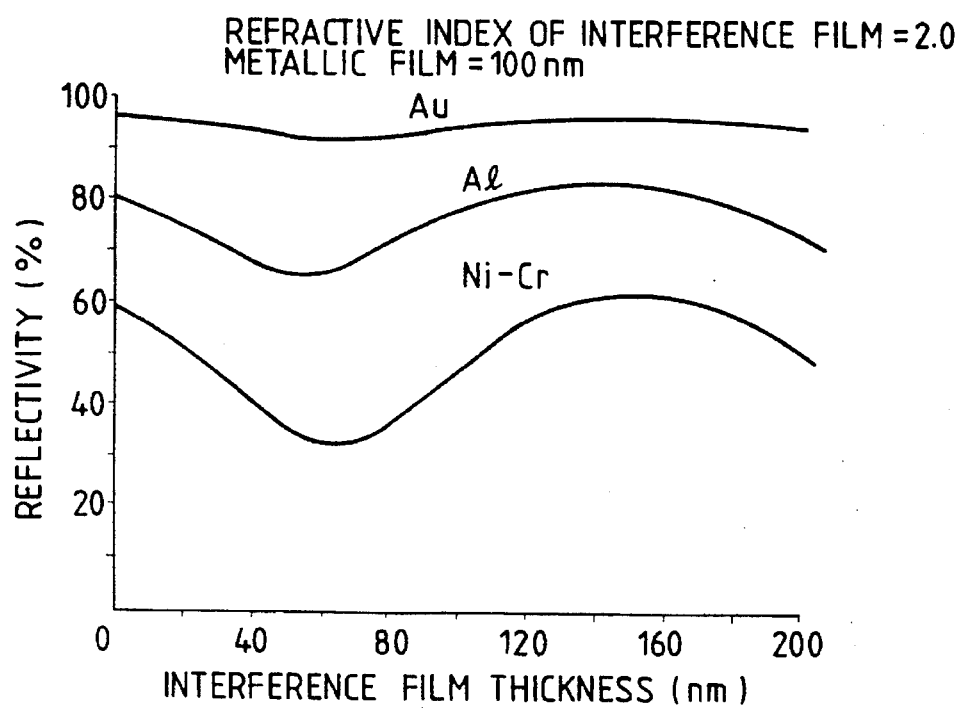

FIG. 3 and FIG. 4 show embodiments of optical disk film constitutions suitable for carrying out the present invention. In the drawings, 130 identifies a transparent substrate, such as glass or plastic, 141 identifies an interference film of dielectric, and 144 identifies a reflective film, such as a metal film. Reproduction light impinges from the side of the transparent substrate 130 like a common optical disk. FIGS. 5a and 5b show a result of analysis on the characteristics of these disks by using a computer. Here, multiple interference of light was not taken into account in the calculation, and refractive indices of respective films were estimated, using a spectro-photometer, based on the measurement result of reflectivity and transmissivity on samples prepared by vacuum evaporating a film on a glass substrate.

FIG. 5(a) shows a relationship between thickness of the reflective films and reflectivity of the disks in the case when the reflective film 144 in the film constitution of FIG. 3 is Au, Al, and Ni—Cr, respectively. When the film thickness is thin, i.e. below 50 nm, the disk reflectivity increases along with increase of reflective film thickness. When the reflective film thickness becomes thick, reaching more than 100 nm, the disk reflectivity becomes almost constant. This constant value varies depending upon reflective film materials, and in the case of Au the value is about 95%, Al about 80%, and Ni—Cr about 58%, respectively. From this result, for reducing the disk reflectivity to less than 60%, it is understood that the reflective film thickness must be reduced to less than 50 nm, or a Ni—Cr reflective film must be used. When other metal materials are used as the reflective film, the film thickness of the reflective film is determined in the same manner that a ROM disk having reflectivity less than 60% is realized.

When an Au film is used for the reflective film, film thickness of about 20 nm of the Au film achieves the disk reflectivity of 60%, however, dependence of the disk reflectivity on the film thickness is as long as about 30%/10 nm so that attention has to be paid for increasing preparation accuracy of factors such as film quality and film thickness of the reflective film. In contrast, when a Ni—Cr film is used for the reflective film, with its film thickness less than 40 nm disk reflectivity less than 60% is achieved.

Judging from disk forming facility, the film thickness of metal reflective film is preferably more than 100 nm, in this instance, such film constitution is desired in which the disk reflectivity is finely adjusted. Thereupon, FIG. 5b shows a relationship between reflectivity and film thickness of an interference film on a disk of which film constitution makes it possible to change the disk reflectivity by making use of light interference, namely, the film constitution using a dielectric interference film as shown in FIG. 4. Here, a relationship between reflectivity of the disk and film thickness of the interference film was calculated in case when reflective films of Au, Al, and Ni—Cr film having a film thickness 100 nm, and an interference film of dielectric film having refractive index of 2.0 were used. As the materials to be used here for the dielectric interference such materials as ZnS, $Si_3N_4$, $AlO_3$, AlN, and $Ta_2O_5$ are preferable. These materials have comparatively large refractive indices of about 2 and are easily formed into a film of good quality such as by a spattering method. Refractive indices of materials such as SiO and $SiO_2$ which are also dielectric materials, is about 1.5, and when a transparent substrate which was conventionally and commonly used is employed, because both have almost the same refractive indices, substantially no reflection at the interface between the transparent substrate and the dielectric interference film appears, and no advantageous optical interference effect is expected such that proper transparent substrate materials are selected.

As seen from FIG. 5(b), the optical interference is induced by adding the dielectric film and the reflectivity of the disk can be decreased. In this instance, the reflectivity of the disk varies depending on the film thickness of the interference film, even the largest rate of variations which the Ni—Cr reflective film exhibits is less than 5%/10 nm. This rate of variation is relatively small in comparison with a disk including only the above-mentioned reflective film, and the requirement of film thickness precision is reduced correspondingly thereto and the preparation thereof is facilitated. The higher the reflectivity of the reflective film itself is, the larger the control range of the disk reflectivity with the interference film is, and the reflectivity reduces in the following order of Ni—Cr, Al, and Au, and in the case of Au reflective film substantially no effect of the interference film appears. Here, for example, for realizing a ROM type optical disk having reflectivity of 30%, a Ni—Cr film of film thickness of 100 nm and ZnS film of film thickness of 65 nm are used. Films of materials such as $Si_3N_4$, $Al_2O_3$, AlN, and $Ta_2O_5$ may be used instead of the ZnS film.

Figure 6A:
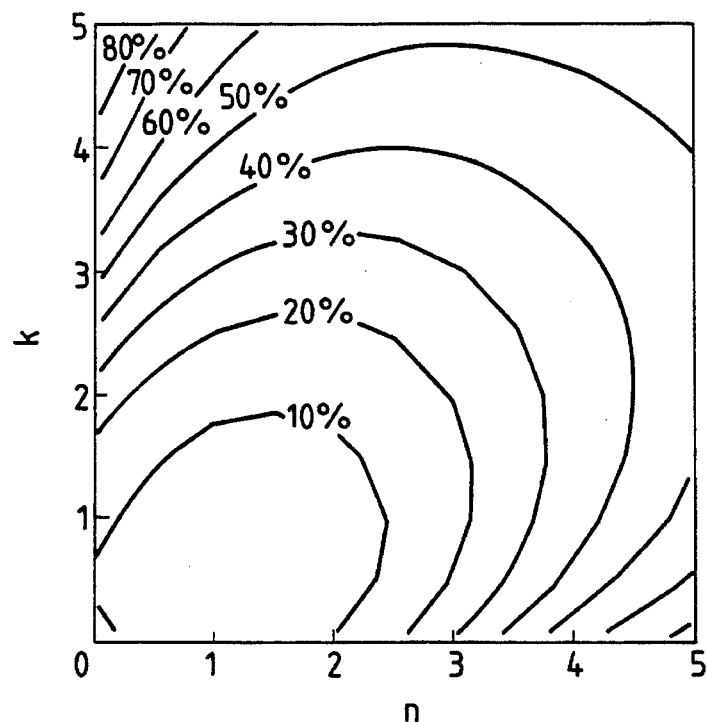
Figure 6B:
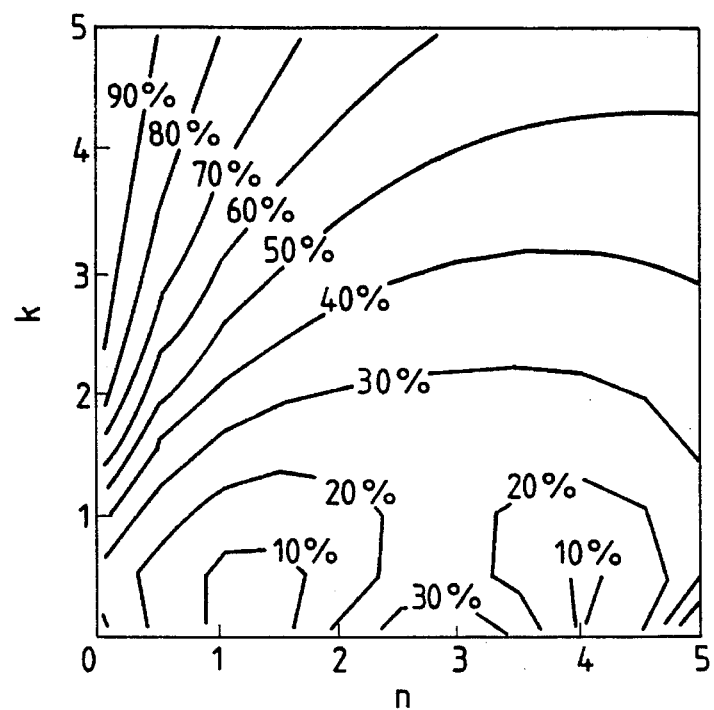

In a ROM type optical disk of the present invention, the disk is constituted by a dielectric reflective film other than metallic films. Classifying reflecting films in view of the refractive indices, with regard to refractive indices of the metallic film the real number part n thereof is below 1, and the imaginary number part thereof is above about 3. On the other hand, with regard to the refractive index of the transparent dielectric film, the real number part n thereof is about 1 through 3, and the imaginary number part thereof is substantially 0. Regarding the refractive index of a non-transparent dielectric film, the real number part n thereof is about 1 through 3, and the imaginary number part thereof is larger than 0. FIG. 6 shows calculation results indicating a relationship between respective real number and imaginary number parts in refractive index of the reflective films, and the reflectivity of the disk in the case that the film thickness of the reflective film in the film constitution of FIG. 3 is 30 nm and 100 nm. It is assumed that glass or polycarbonate is used for the transparent substrate and its refractive index of 1.5 is used for the calculation. In the case of the reflective film having a film thickness of 30 nm as shown in FIG. 6(a), the disk reflectivity, for instance, for attaining a 30% reflectivity, a transparent dielectric film having refractive index of n=3 and k=o is used. Because refractive indexes of ordinary dielectric materials are less than 2.5, it is difficult to reduce the disk reflectivity to 30%. However, when a $Ta_2O_5$ film (n=2.3, k=O) and a ZnS film (n=2.4, k=o) are used, reflectivity of about 15% is achieved. In the case of a reflective film having a film thickness of 100 nm as shown in FIG. 6(b), the disk reflectivity of 30% is achieved by using the same $Ta_2O_5$ film and ZnS film. Further, the reflectivity of 30% is also achieved by using a $Cr_2O_3$ film (n=2.7, k=0.4). Generally, when a dielectric film is used for a reflective film, a large reflectivity exceeding 40% can not be expected. Therefore, it is desired to increase disk reflectivity as high as possible by using optical interference. In this instance, the conditions in which the disk reflectivity is maximized are that in the equation 2nd=mλ, m=1, 2, 3, . . . be selected, wherein n is refractive index of dielectric film, d is film thickness, λ is wavelength of reproduction light. For instance, in the case that a dielectric film of $Si_3N_4$ having refractive index n=2.0, a light source of semiconductor laser having λ=830 nm, and an order of interference m=1 are selected, the reflectivity becomes maximum at d=208 nm. In the same manner as explained with reference to FIG. 5a, in the constitution of a transparent substrate/dielectric film, the disk reflectivity can also be set by changing film thickness of the dielectric film.

The film constitution of the ROM type disk explained above satisfies the minimum requirements, and in addition to these, a protective film is frequently added to protect the disk. Further, the disk is required to be provided with a guide groove for continuous servo operation, or a wobble pit and a clock pit for sample servo operation, and is to record address information in a data area and software information provided for users. These are formed beforehand on the substrate in the form of recesses and protrusions with a stamper, and the reflectivity of the recessed portions is generally adapted to show small reflectivity during reproduction of the disks. The gist of the present invention is to constitute the film of the ROM type disk so that the reflectivity thereof reduces to less than 60%, and such other films and supporting materials may be added to the extent that they never affect the optical characteristics.

By using the ROM type optical disk of the present invention and accommodating the disk inside a credit card size case, the thin ROM type optical disk memory medium with handling facility and an optical memory system using the same are constituted. Hereinbelow, this new optical memory system is explained.

Figure 7A:
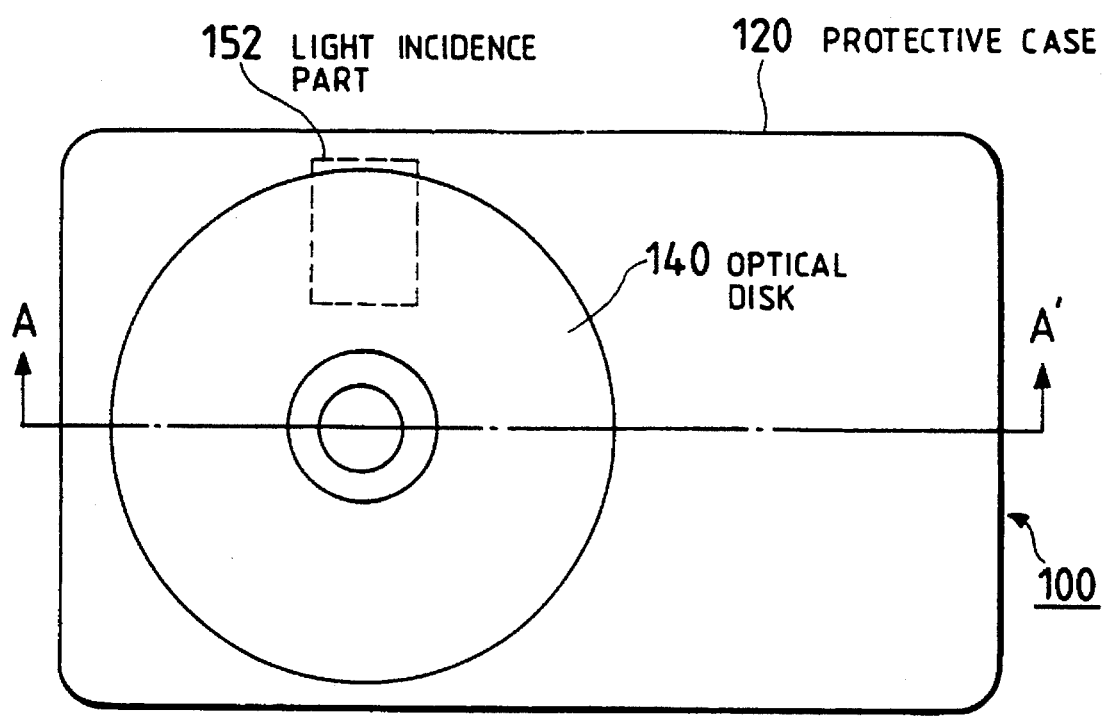
FIG. 7(a) and FIG. 8(a) are plan views showing structures of optical disk memories forming embodiments according to the present invention.
Figure 7B:
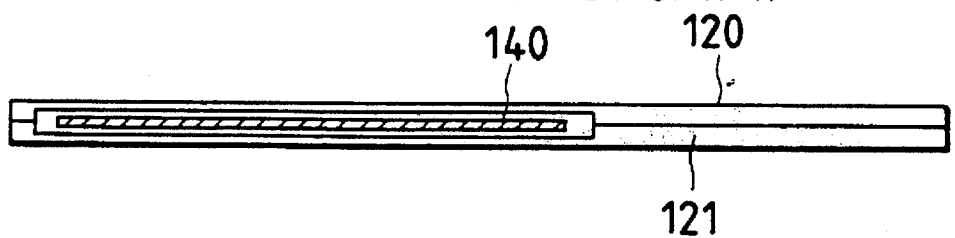
FIG. 7(b) and FIG. 8(b) are cross-sectional views showing the structures of the optical disk memories in FIG. 7(a) and FIG. 8(a) respectively.

FIG. 7(a) and FIG. 7(b) show an embodiment of an optical memory medium accommodated in a transparent protective case (hereinbelow called "optical-disk-in-card") which is suitable for realizing an optical memory system of the present invention. As shown in the drawings, in an optical-disk-in-card 100 according to the present embodiment, an optical disk 140 is accommodated in card size protective case formed by parts 120 and 121. Here, in connection with the optical disk 140, at least a light beam impinging part 152 of the protective case is constituted by a transparent plate.

In the conventional optical disk device, when impinging light on the disk, a shutter of the protective case was opened, and the light impinged directly the optical disk. Therefore, because dust and rubbish entered through the shutter, as a countermeasure, a transparent substrate having a thickness of 1.2 mm had to be used as the substrate.

In contrast, in the optical disk memory of the above-mentioned embodiment, because the light impinging part 152 is covered with the transparent protective plate 120, dust and rubbish do not directly stick to the optical disk, and therefore the thickness of the substrate which supports the optical disk medium need not be as thick as 1.2 mm. Assuming the thickness of the case is about 0.2 mm, the thickness of the substrate can be reduced to below 1 mm.

Further, in the optical disk memory of the present invention, the optical disk 140 is not fixed in the protective case 120, but is mounted therein so as to be freely rotatable.

Figure 1:
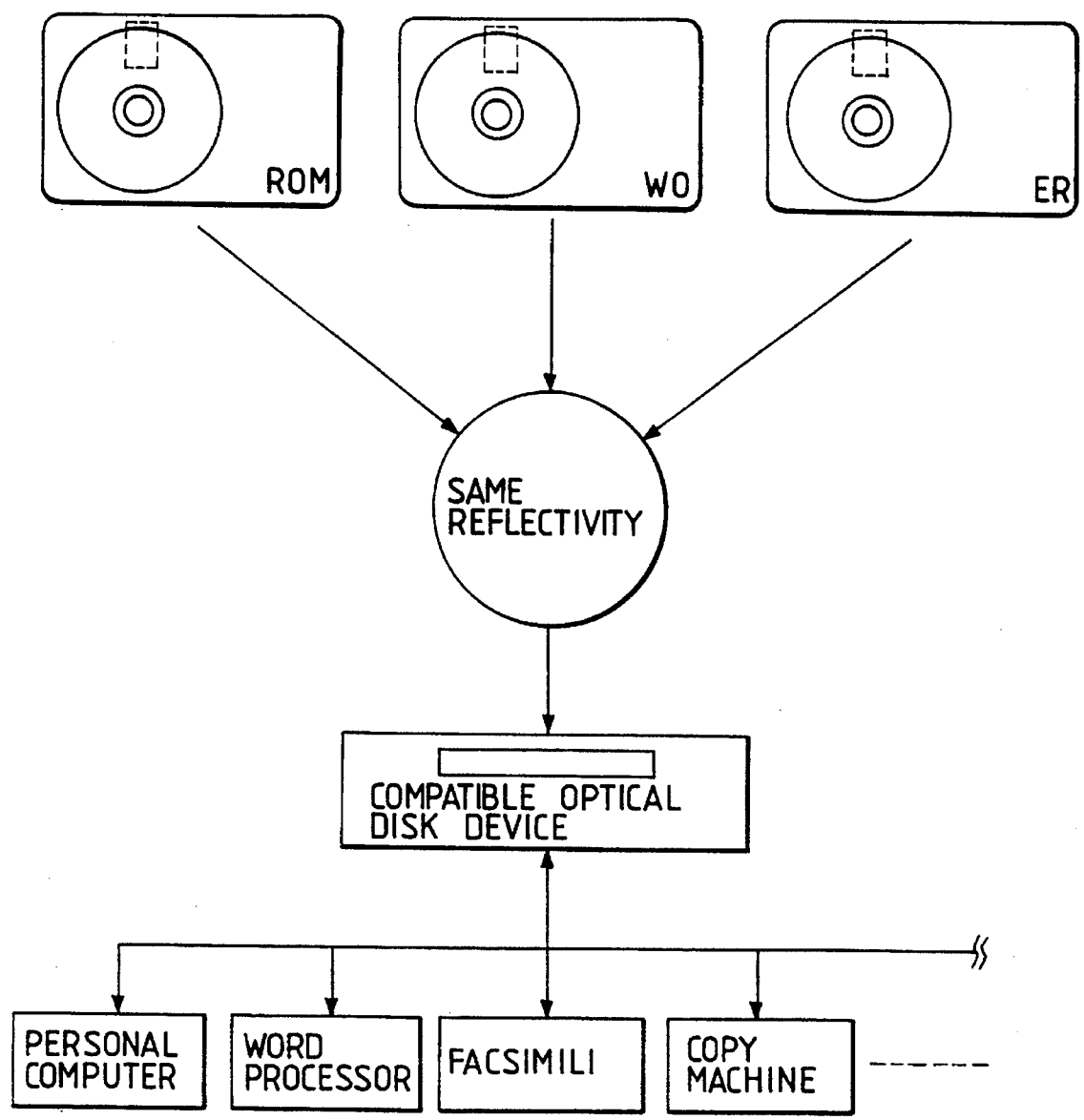
FIG. 1 is a conceptual view showing one embodiment of an optical memory system with medium compatibility according to the present invention.
Figure 2:
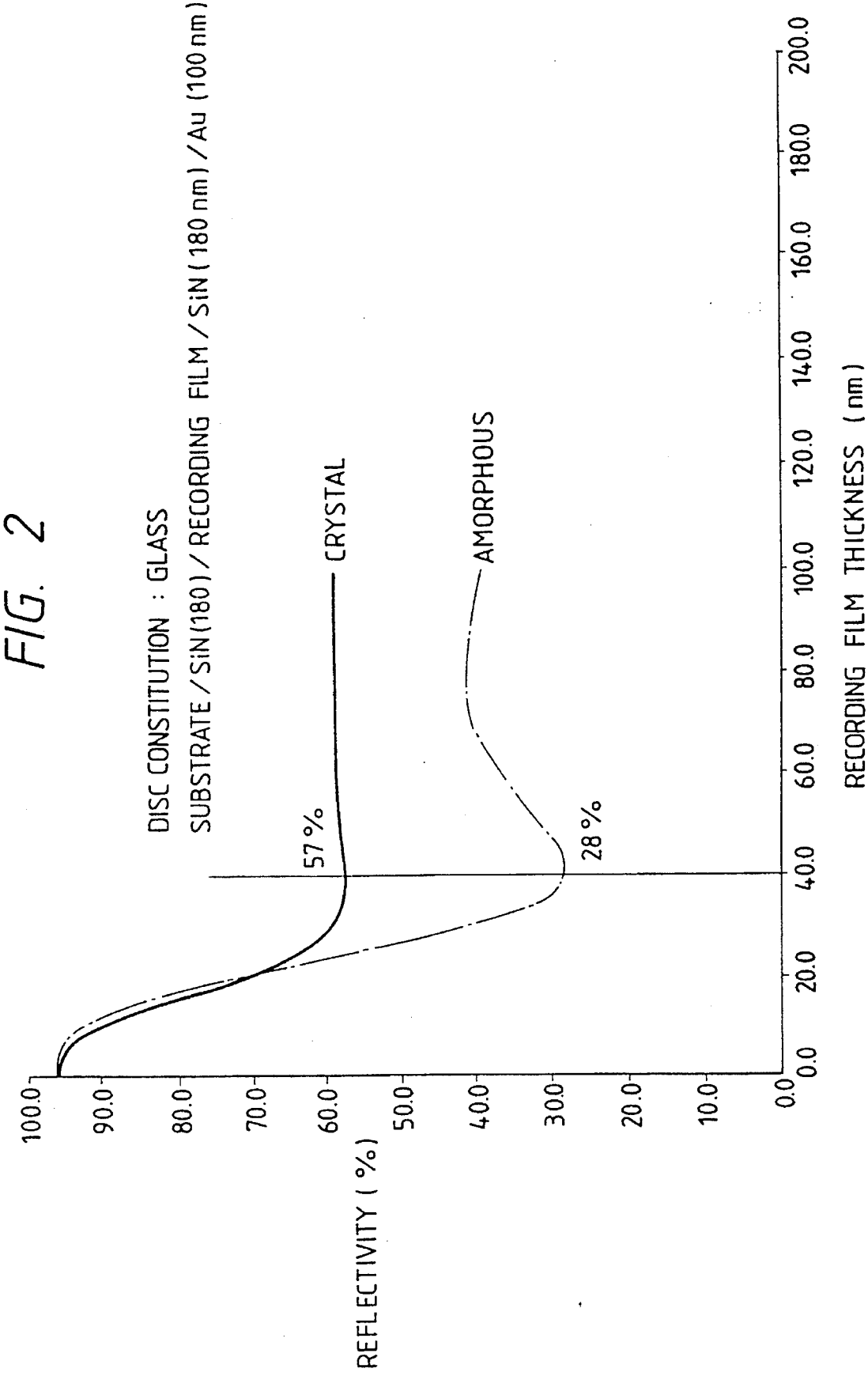
FIG. 2 is a partial cross sectional view of an optical disk showing one embodiment of an optical design for a rewritable type optical disk which uses $Sb_2Te_3$ film.

Because the optical-disk-in-card of the present invention is small sized, light weight and thin, and the handling thereof is easy, it is suitable for use as a common memory medium in systems such as a desk top type and lap top type personal computer, a work station, a word processor, a facsimile machine, a copy machine, a television game machine, a telephone, an electronic still camera, a video camera, a portable music reproduction machine, an electronic pocketable system notebook, an electric calculator, and a measurement instrument. FIG. 1 shows an embodiment of such optical memory system. Through the employment of compatible type optical disk devices for the respective devices, the optical disk in card can be commonly used as their memory medium.

Figure 8A:
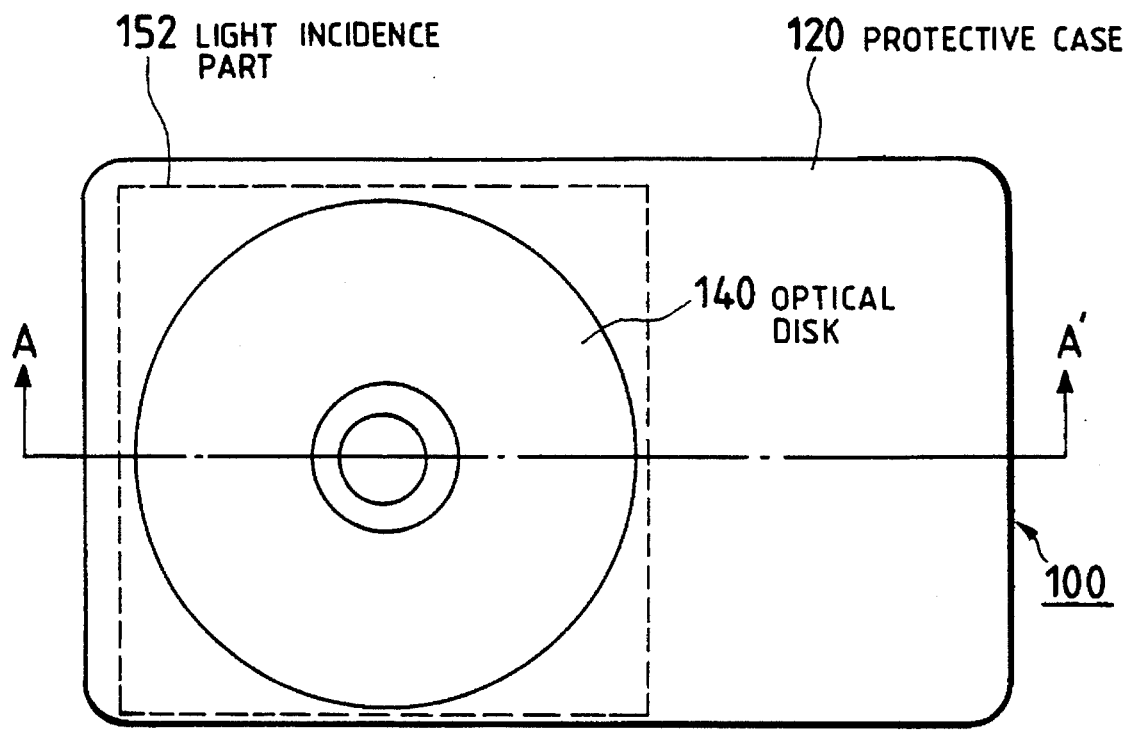
Figure 8B:
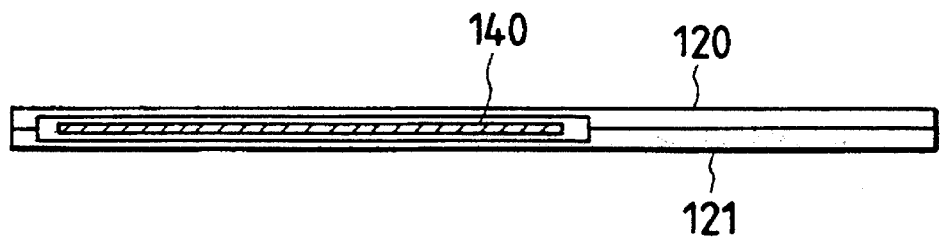

The compatible optical disk devices can also be built-in in every device. In this case, since the configuration of the respective devices differ from each other, it is desired that the built-in reproduction devices of the optical-disk-in-card have a larger freedom for their layout. An embodiment satisfying this requirement is explained below. FIG. 8(a) and FIG. 8(b) show an embodiment wherein the optical impinging part 152 of the optical-disk-in-card covers the entire surface of the optical disk 140. Consequently, an optical head can access the optical disk from any positions in the circumferential direction thereof. Namely, the degree of freedom for the layout of the reproduction device increases, and the reproduction device of the optical-disk-in-card can be built-in in a variety of devices.

Figure 9:
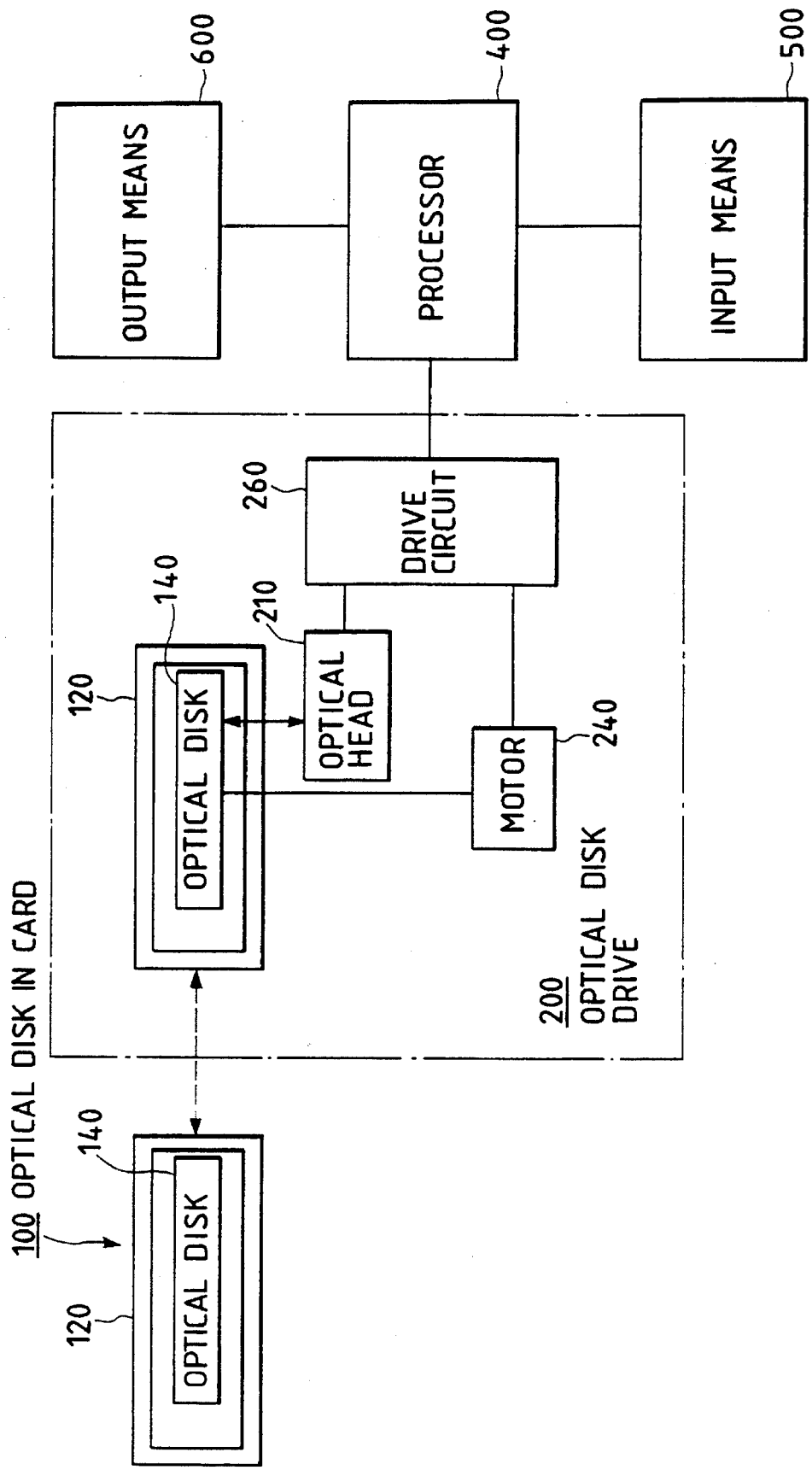
FIG. 9 is a block diagram showing an example of an information processing device forming one embodiment according to the present invention.

FIG. 9 shows an embodiment of an information processing device having a specific constitution which uses the optical-disk-in-card shown in FIG. 1. The information processing device of the present invention is composed of the optical-disk-in-card 100, an optical disk drive 200, a processor 400, an input means 500, and an output means 600. The optical-disk-in-card 100 is composed of the optical disk 140 and the protective case 120, and is detachably mounted on the optical disk drive 200. Further, the optical disk drive 200 is composed of an optical head 210, a motor 240 for driving the optical disk 140, and a drive circuit 260 for controlling the optical head 210 and the motor 240. The drive circuit 260 controls rotational speed of the motor 240 by a command from the processor 400, and also performs a demodulation function on the reproduced data. The processor 400 executes calculation processing or reproduction of the information from the optical disk 140 in response to commands from the input means 500, and also outputs the recorded contents of the optical disk 140 or calculation results through the output means 600 when required.

Figure 10:
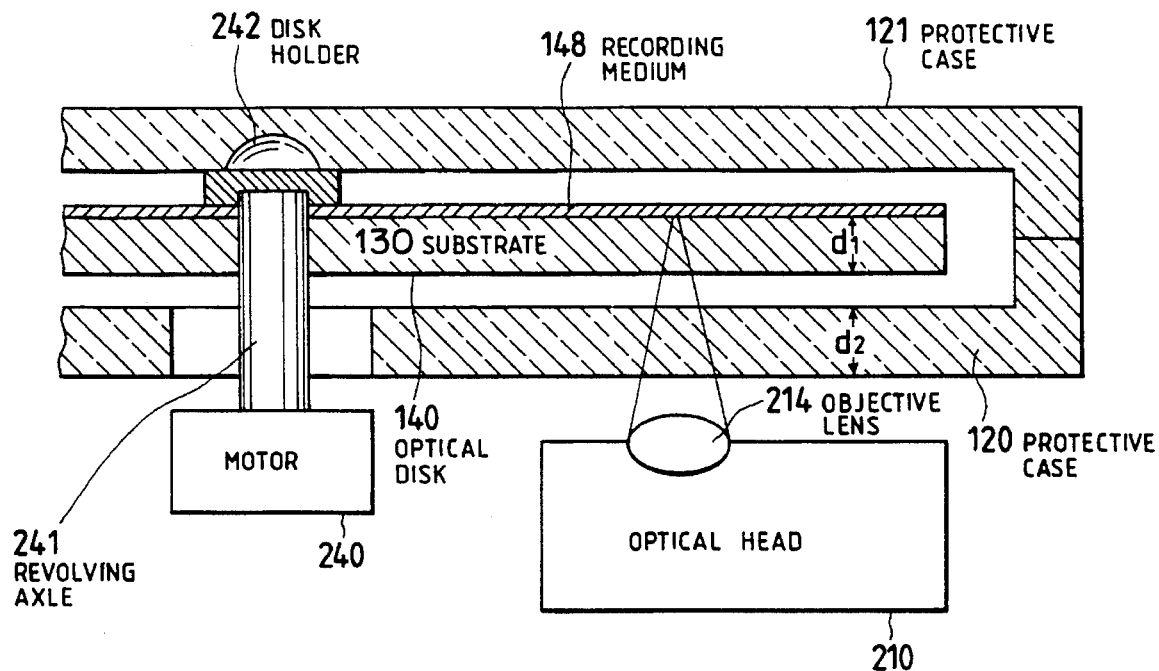
FIG. 10 and FIG. 11 are partial cross-sectional views for explaining an optical-disk-in-card of the present invention.
Figure 11:
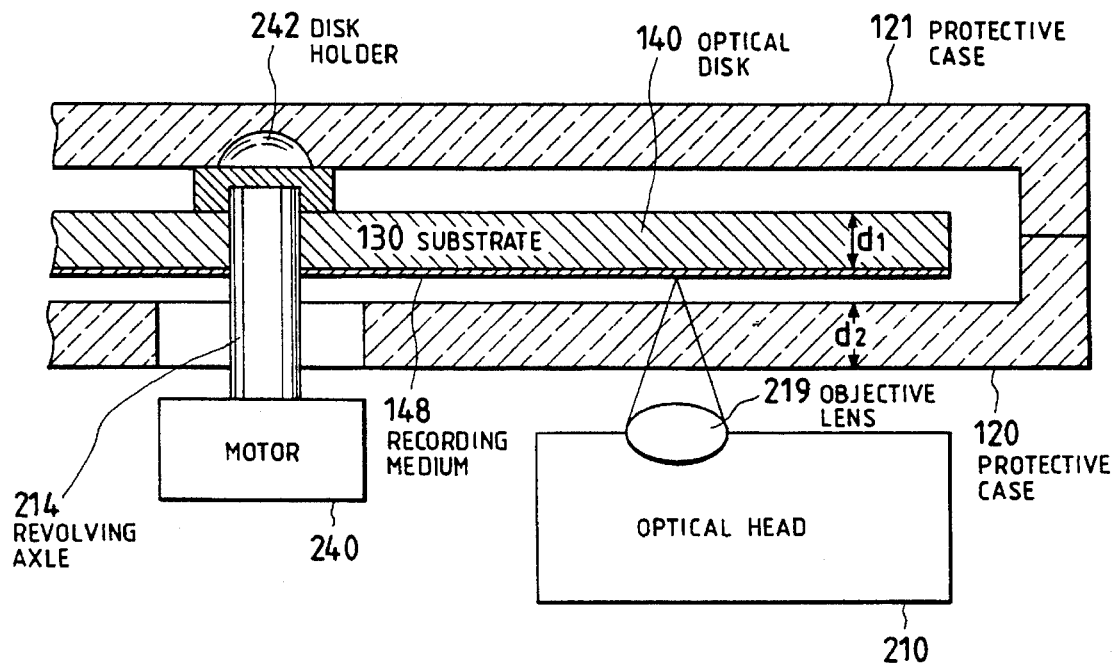

FIG. 10 and FIG. 11 are for explaining the usage of the optical-disk-in-card which is used in the present invention, by which, a thin optical disk is enabled. The present invention is composed of a substrate 130 for support of a recording medium 148, the protective cases 120 and 121 for protecting thereof, the motor 240 for rotating the disk, and the optical head 210. The optical head 210 may use a conventional optical system as described in Nikki Electronics of 21. Nov. 1983 on pp. 199–213. Further, the optical disk is secured to a rotational axle 241 and is rotated therearound, while being held by a disk holder 242 for stable rotation. Further, because the protective case 121 does not constitute a light impinging part, it may be either transparent or non-transparent.

With these constitutions, the reproduction of data from the optical disk is realized as follows. Namely, the power of the semiconductor laser is controlled to be at about 1 mW on the information recording surface, and by continuously irradiating such laser beam, the information recorded in the optical disk is reproduced as signals of varying reflectivity. By demodulating the signals with the drive circuit 260, necessary information can be read.

Here, a characterizing point of the present invention is that the laser beam is irradiated on a recording medium 148 through the transparent protective case 120. Namely, according to the present invention, sticking of dust in the air on surfaces such as the substrate 130 and the recording medium 148 is prevented, and the total plate thickness $d_2$ of the transparent protective case 120 and the plate thickness $d_1$ of the substrate 130 is reduced to less than about 1.2 mm. For example, when $d_2$ of 0.2 mm is selected, $d_1$ can be reduced to less than about 1.0 mm, and the substrate thickness of 1.2 mm which was conventionally understood as the minimum thickness is further reduced to obtain a thinner substrate. This produces two effects, namely are miniaturization of the drive device 200 and decreasing of electric power consumption. When the substrate 130 becomes thin, the rotating inertia of the disk 140 is reduced, and the output of the motor 240 can be reduced, therefore miniaturization and light weight construction of the motor 240 are achieved. Further, when the total of the plate thickness $d_2$ of the transparent protective case 120 and the plate thickness $d_1$ of the substrate 130 becomes thin, the focal distance of an objective lens for the optical head 210 becomes short, thereby reducing the diameter of the objective lens and the beam diameter. At the same time, because all of the optical elements in the optical heads are miniaturized, miniaturization and light weight construction of the optical head 210 is achieved. Namely, the optical disk drive device is miniaturized and becomes light-weight as a whole, and the reduction of the electric power consumption is achieved.

FIG. 11 shows an embodiment in the case where the light impinges from the side of the recording medium 148. In that case, an opaque material can be used for the substrate 130. For the substrate materials, in addition to the conventional glass and transparent plastics, metals such as stainless steel, and non-transparent plastics such as polystyrene, can be used. When a metallic substrate such as stainless steel is used, in addition to its large thermal conductivity and high heat resistance in comparison with the transparent plastics, its mechanical strength increases, so that warping of the substrate caused during formation of the reflective film by vacuum processing such as spattering is decreased. Non-transparent plastics such as polystyrene are used for a substrate of a magnetic floppy-disk, and when such are used for the substrate, inexpensive optical disks can be supplied.

Figure 12:
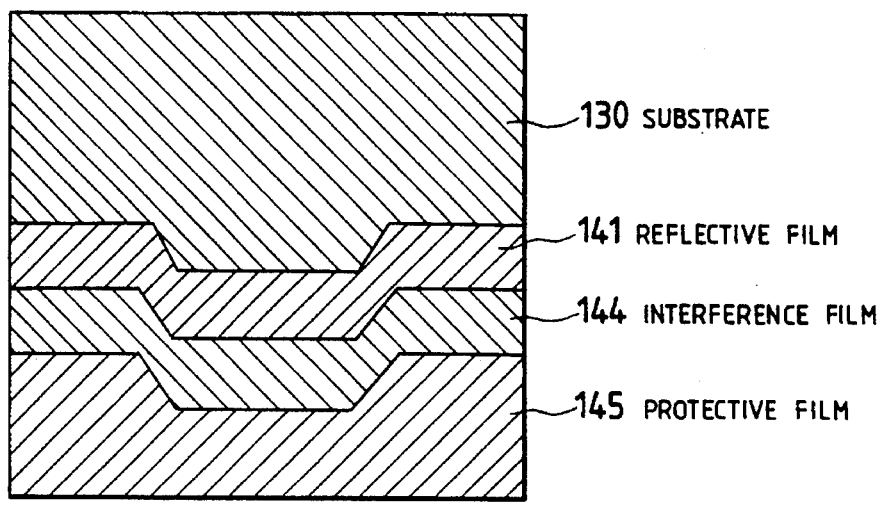
FIG. 12 is a cross-sectional view showing one embodiment of a film constitution in the ROM type optical disk suitable for the present invention.

FIG. 12 shows a film constitution of an optical disk suitable for the embodiment in FIG. 11. The optical disk is composed of a substrate 130, a reflective film 141, an interference film 144, and a transparent protective film 145. The light impinges from the side of the protective film 145, therefore, the feature of the present embodiment is that the constitutional relationship between the reflective film 141 and the interference film 144 is inverted from that of the embodiment in FIG. 4. The transparent protective film 145 is effective against dust like the transparent substrate of the conventional optical disk, and the thickness of the protective film is required to be at least 10 μm in case that the diameter of dust which sticks to the optical disk is about 1 μm. For the materials of the protective film 145 transparent dielectric materials having a refractive index of less than about 1.5 such as UV resin and $SiO_2$ film are suitable.

Figure 13:
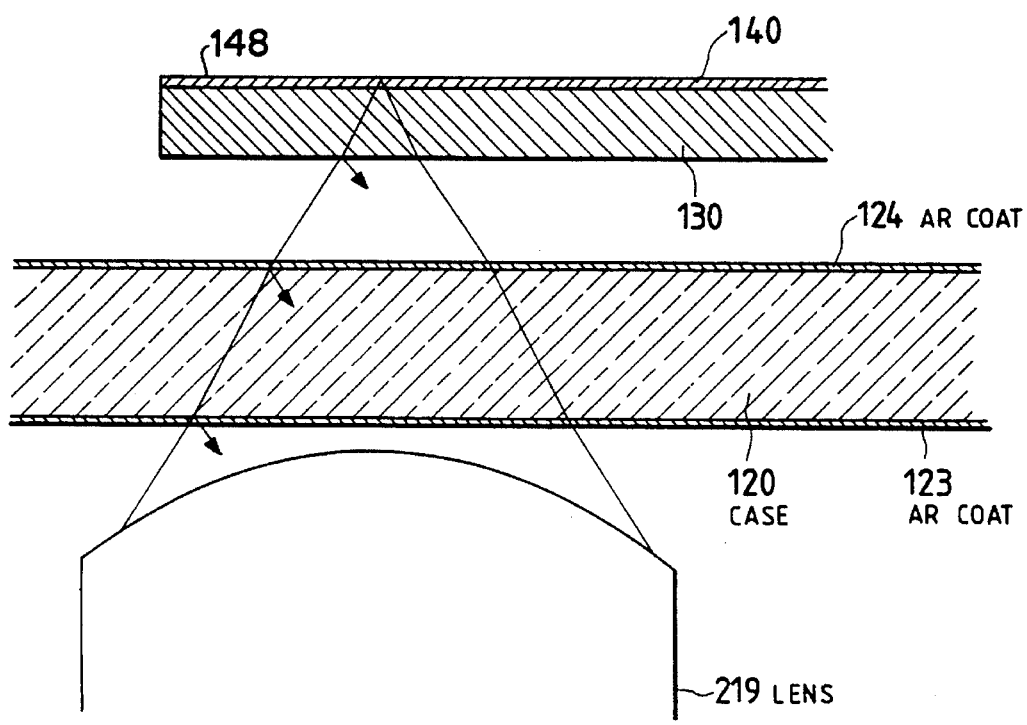
FIG. 13 is a partial cross-sectional view showing one embodiment in which an anti-reflection coat is provided on a protective case of an optical disk memory according to the present invention.

FIG. 13 shows a constitution of an optical disk in card of the present invention suitable for increasing utilization efficiency of light. The light from the semiconductor laser light source in the optical head is, as shown in the drawing, converged on an optical recording medium 148 by an objective lens 219, but a part thereof is reflected on the surface of a protective case 120 and the substrate 130 and does not reach the optical recording medium 148. This reflectivity is about 3 through 4% for each surface. Therefore, by applying anti-reflective coats (AR coat) 123 and 124, the reflection by the protective case 120 is reduced to increase light utilization efficiency of the optical system. The refractive index of the anti-reflective coat is $\sqrt{n}$ when the refractive index of the protective case is n, the film thickness thereof is $m\lambda/4$ m (m=1, 3, 5, . . . ) and the wavelength of the light source is $\lambda$. For example, when the protective case is made of a transparent plastic having a refractive index of about 1.5, $MgF_2$ (the refractive index is 1.38) which is same as common optical glasses can be used for the material of the anti-reflective coat.

Figure 14A:
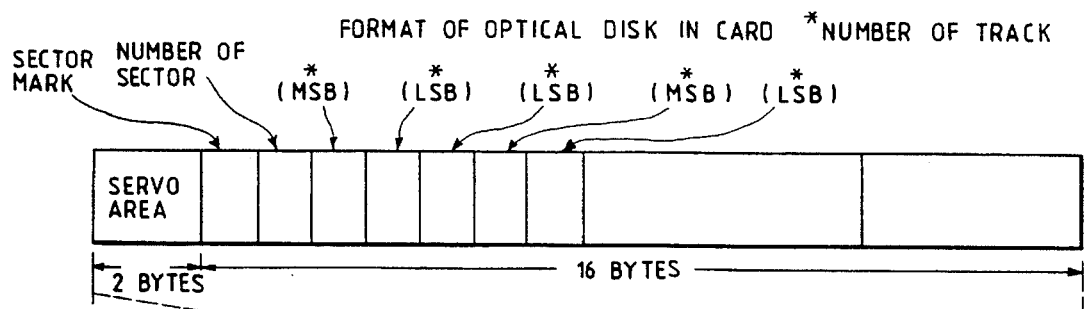
FIG. 14(a), (b), and (c) are developed views showing a format example of an optical disk memory according the present invention.
Figure 14B:
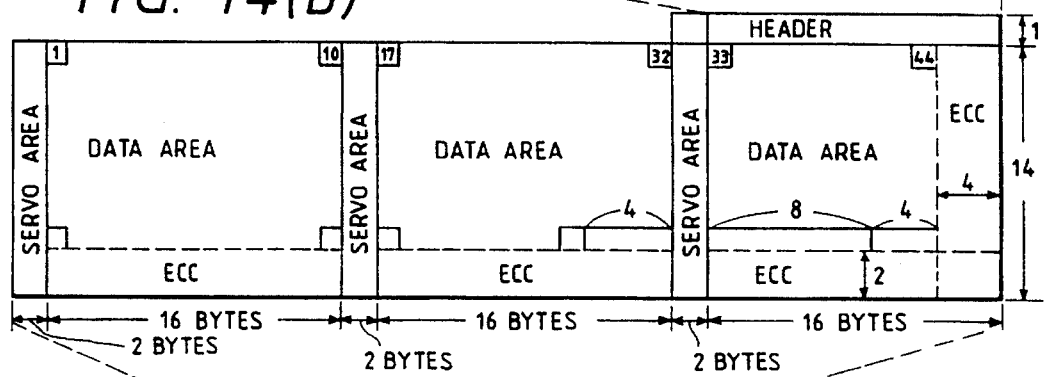
Figure 14C:
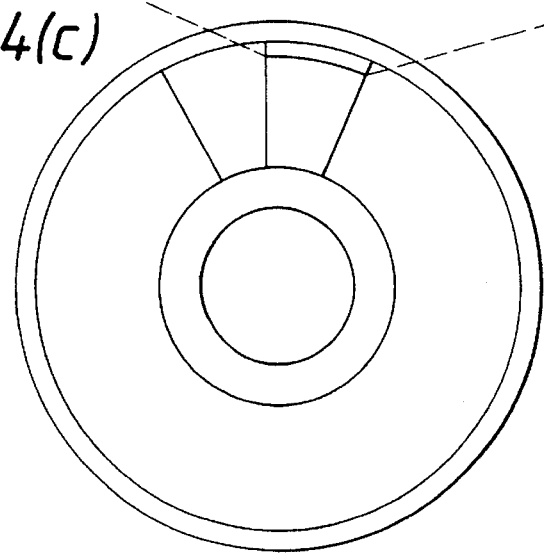

FIG. 14 shows an embodiment of a disk format suitable for recording code data in the ROM type optical disk of the present invention. Here, based on the format of a sampled servo disk of 5.25 in. and rotating at 1800 rpm satisfying the ISO standard, the format for the optical disk in card is determined. The diameter of the optical disk in the drawing is determined to be 48 mm so as to be capable of being accommodated within a credit card. The data structure is 16 sectors/truck, 43 segments/sector, and 18 bytes/segment. The user area is 512 bytes per sector, and the servo area is 2 bytes per segment. When the data area of the disk is determined to be 30 through 46 mmφ and the truck pitch is 1.5 μm, the number of the trucks is about 5300, the memory capacity on one side is 43 megabytes, the rotational speed of the disk is 3600 rpm, and the data transfer rate is 0.6 megabytes/sec. The modulation method is 4-15 modulation, and the truck and sector address are recorded in the header at the top of the sector. The error correction code (ECC) is 4-2 format, and the code calculation method is twice repeated C1–C2. In addition to the above, a disk format which is a combination of the continuous servo method and 2–7 modulation method is widely used, and such can be used for the optical-disk-in-card of the present invention.

Next, an embodiment of a write-once type optical disk and a rewritable type optical disk is shown which is suitable for realizing an optical memory system of the present invention having a disk compatibility between reproduction-only type, and write-once type and rewritable type disks. In the optical disk memory system of the present invention having compatibility between the reproduction-only type, and write-once type and rewritable type media, for the write-once type optical recording medium, inorganic materials containing a material such as Te as their base or organic materials such as cyanin series and naphthalo-cyanin series can be used. Further, for the rewritable type optical recording medium, crystalline-amorphous phase transition type recording materials such as Ge—Sb—Te series, In—Se—Tl series, In—Sb—Te series, and Sb—Te series, or photoelectromagnetic type recording materials such as Tb—Fe—Co series, and Gd—Fe—Co series can be used. Namely, any media capable of reproducing, recording, or erasing information by laser light can be used for the media of the present invention.

Figure 15:
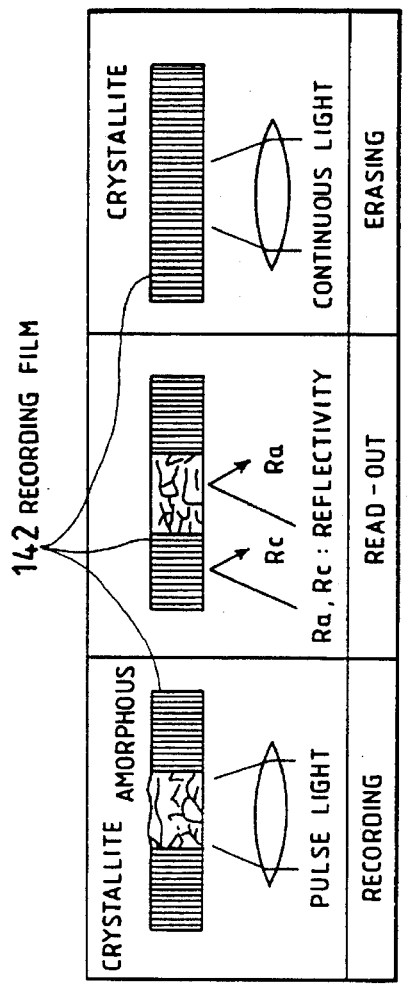
FIG. 15 is an explanatory view on principles of recording, reproducing, and erasing in a phase transition type optical disk.

Here, an example is explained wherein recording, erasing, and reproducing are carried out by making use of a rewritable type phase transition optical disk. FIG. 15 shows a principle of recording, erasing, and reproducing in the phase transition optical disk. As shown in the drawing, the recording is realized by irradiating the recording medium with a relatively high power laser beam to melt the recording film, and thereafter suddenly cooling the recording medium to quench it into an amorphous-state. On the other hand, the erasing is realized by irradiating the recording film with a relatively low power laser beam, and by crystallizing the recording film from the amorphous-state. Further, the reproducing is realized by irradiating the recording medium with a continuous beam having a further lower power, and information is reproduced based on the reflectivity difference between the amorphous-state and the crystalline-state.

For the recording film, any phase transition type media can be used such as a recording film of In—Sb—Te series as described in Proceedings of International Society for optical Engineering (SPIE) (Vol. 1078, pp. 11–26, (1989)), or an overwritable recording film as described in the same paper on pp. 27–34 may be used.

Figure 16:
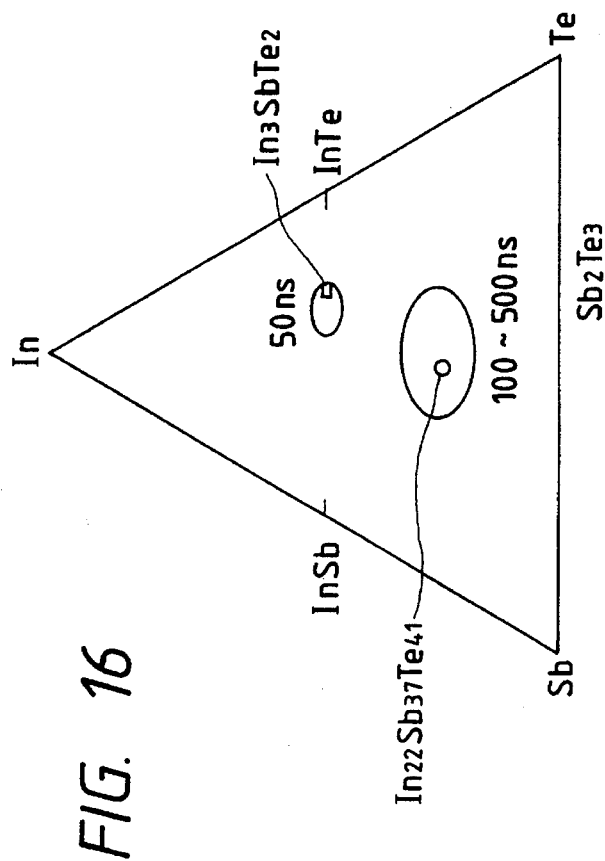
FIG. 16 is a diagram showing crystallization speed of In—Sb—Te recording medium which is one example of the materials for the phase transition type optical disk.
Figure 17:
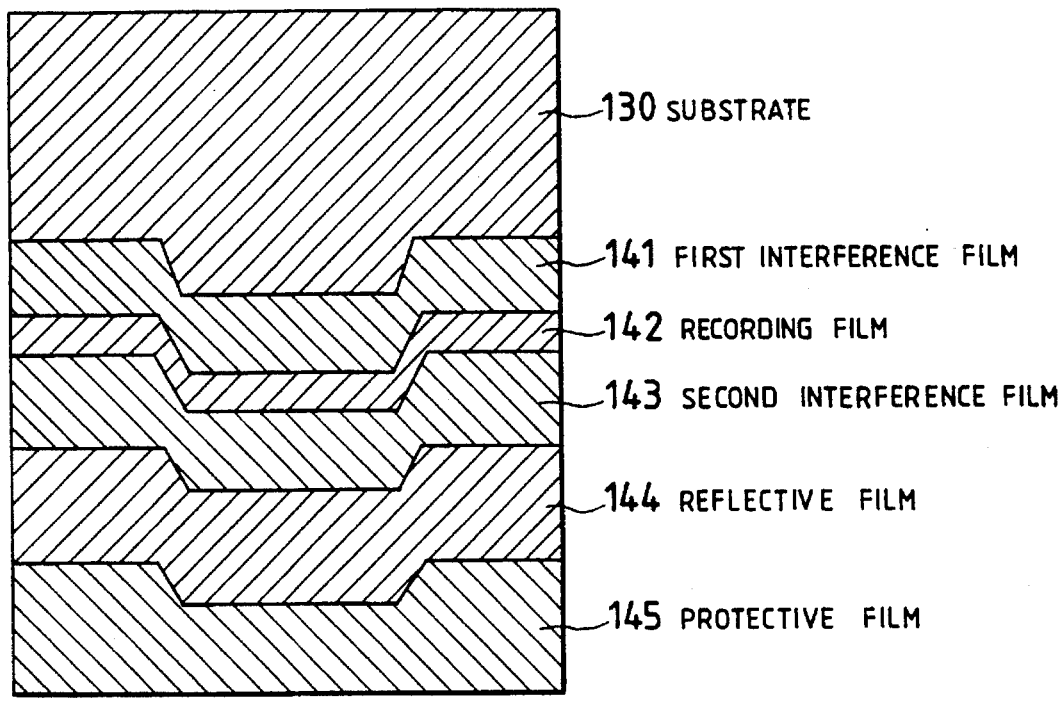
FIG. 17 and FIG. 18 are cross-sectional views showing multi-layered film constitution examples of the phase transition type optical disk.

FIG. 16 shows the crystallizing speed of In—Sb—Te series materials. In the case of this recording film, the crystallizing speed varies from 50 ns to 500 ns depending upon the composition of the materials. Although the crystallizing speed to be employed somewhat changes depending upon the linear velocity v (m/s) of the optical disk and the film structure of the optical disk medium, it is preferable to employ recording films having a range of crystallizing speed from about 500 to 1500/v (ns). Further, FIG. 17 shows a film structure suitable for use in the optical medium in FIG. 10. The optical disk medium is composed of a substrate 130 with light transparency, a first optical interference film 141, a recording film 142, a second optical interference film 143, a reflective film 144, and a protective film 145. As such, in the optical disk medium the light is impinged from the substrate side.

Figure 18:
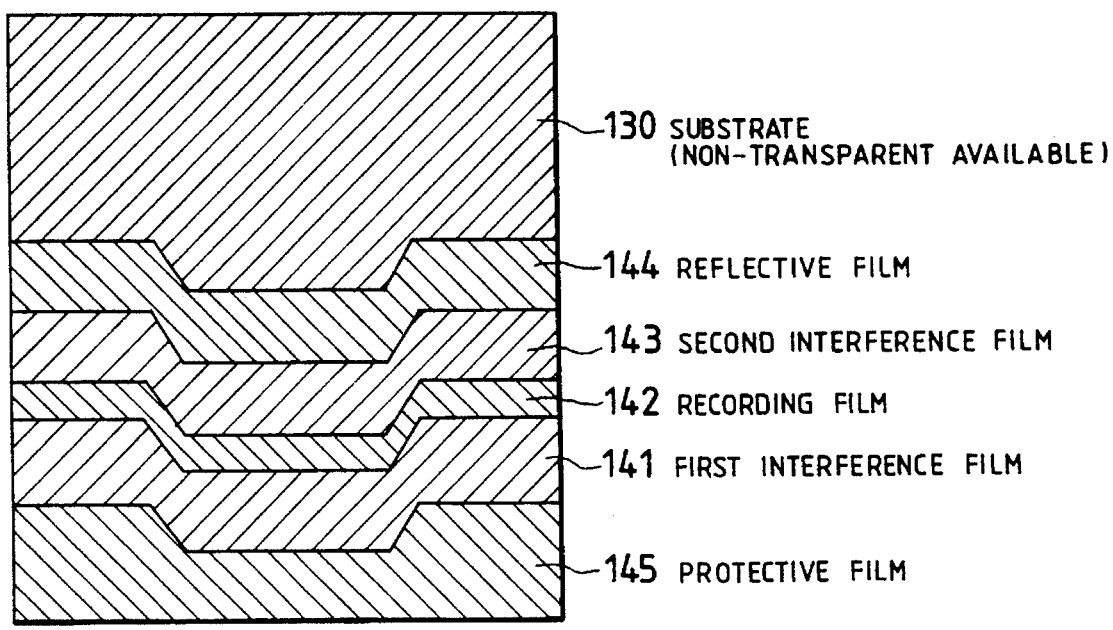

On the other hand, FIG. 18 shows a film structure suitable for use in the optical disk medium in FIG. 11. In this case, since the laser beam is impinged from the protective film side, the feature of this embodiment is that the order from a first optical interference film 141 to a reflective film 144 is inverted. Herein, the interference film performs functions of enhancing contrast through interference of light and of a control film of heat conductivity.

Figure 19:
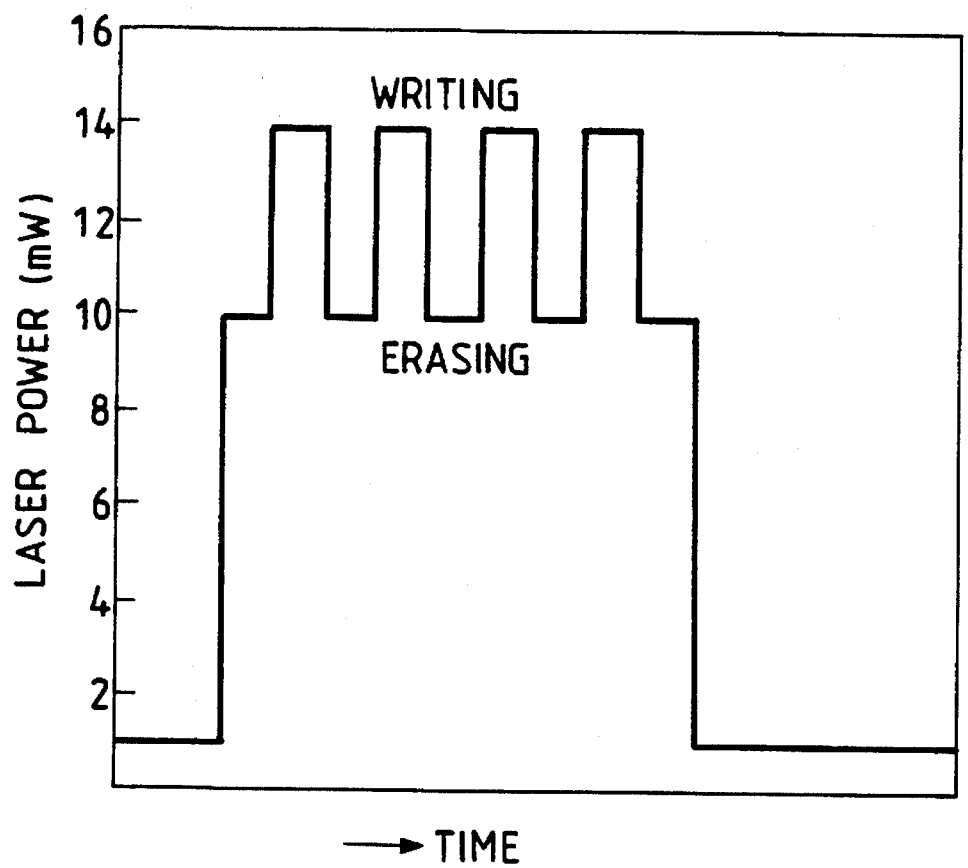
FIG. 19 is an explanatory view of a laser power modulation method during overwriting.

FIG. 19 shows a method of modulation of laser power during overwriting. Namely, during overwriting the laser power is modulated between a power level for erasing and a power level for recording. In this instance, the laser power for erasing is selected from the power which can crystallize the recording film by continuous irradiation, and the power for recording is selected from the power which can amorphize the recording film. For realizing laser power modulation, the drive circuit 260 in the optical disk drive device in FIG. 9, according to a command from a processor 400, is adapted to perform modulation of laser power for recording and erasing and modulation of data in response to the command from the processor 400.

Figure 20:
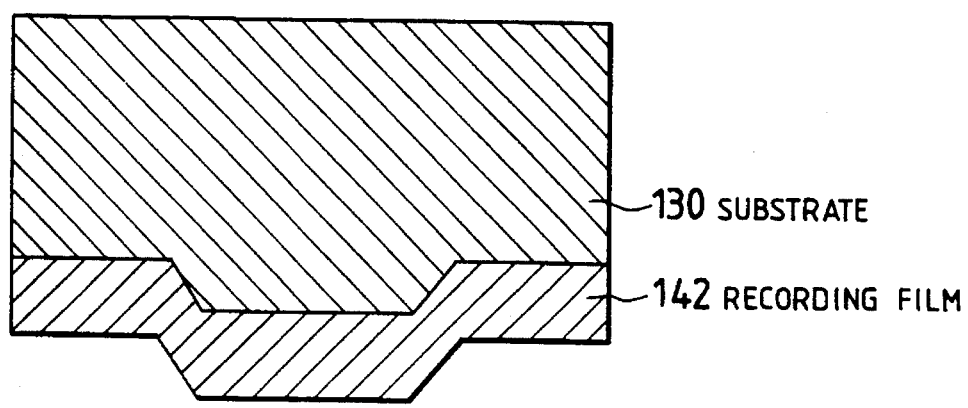
FIG. 20 is a cross-sectional view showing one embodiment of a film constitution of a write-once type optical disk suitable for the present invention.

FIG. 20 shows an embodiment of a film constitution of a write-once type optical disk suitable for realizing the present invention. With irradiation by the laser beam, pits are formed on a recording film 142. For the recording materials, other than Te, and Te base alloy series (Se, As, Sb, In, Sn, Pb, and Bi), organic coloring matters such as cyanine series, phthalocyanine series, and naphthalocyanine series are used.

In all of the optical disks explained in connection with the above embodiments, since information is recorded in terms of reflectivity, the compatibility of the optical disk devices is maintained comparatively easily through standardization of reflectivity. In the present invention, other than these, a photoelectromagnetic rewritable type optical disk can be used. However, in this case, the manner of information recording differs from the above, in that the information is recorded on the disk in terms of direction of magnetic domain which should be kept in mind.

Figure 21:
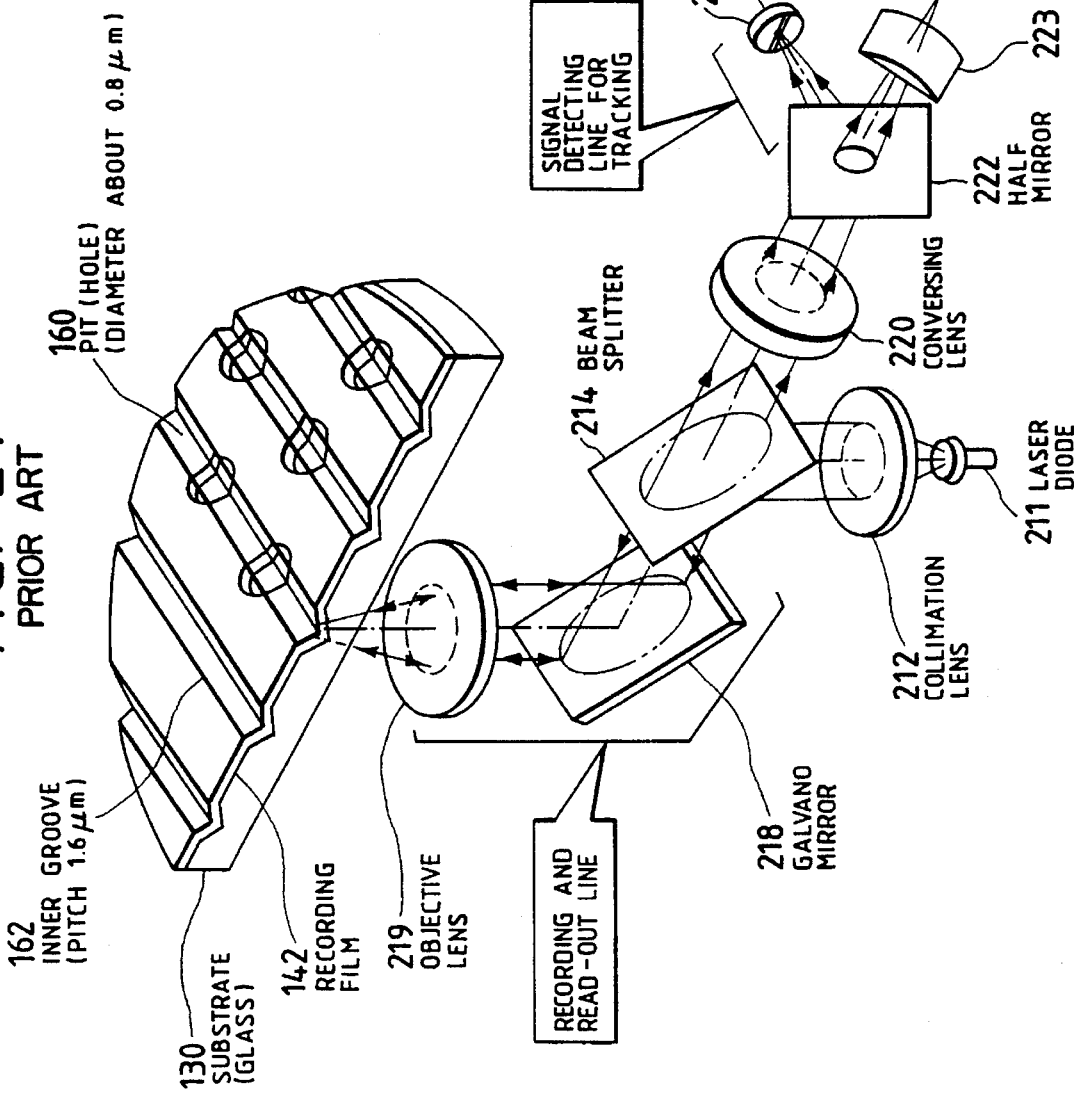
FIG. 21 is a developed view showing a constitutional example of an optical disk and an optical head in a conventional optical disk system.

FIG. 21 is an example of an optical system in an optical head of a conventional optical disk device, which can be used for the optical head of the present invention. This optical system is disclosed in Nikkei Electronics of 21. Nov. 1983 on pp. 189–213. As shown in the drawing, the optical disk is composed of a substrate 130 and a recording film 142, and a track guide groove with a pitch of 1.6 μm is formed on the substrate 130.

On the other hand, the optical head is composed of a semiconductor laser 211, a collimation lens 212 for preparing parallel rays, a beam splitter 214, a galvano mirror 218 for converting optical path, a objective lens 219 for focusing the light onto recording film 142, a converging lens 220 for restricting the light from the beam splitter 214 to an optical sensor system, a half mirror 222 for separating the light to a signal detecting system for tracking and to a focusing signal detecting system a cylindrical lens 223 for detecting a focusing signal, an edge prism 224, and sensors 221a and 221b for detecting focusing and tracking errors.

In the optical system thus constituted, the light emitted from the semiconductor laser 211 is reflected at the beam splitter 214, and is converged on the recording film 142 of the optical disk through the objective lens 219. Further, the light reflected by the disk passes through the beam splitter 214, and is measured by the sensor 221a as a focusing error signal. When there is an error in connection with the focal point, the signal is fed-back to an actuator, not shown, for driving the objective lens 219, to move the position of the objective lens 219 to a position where the focal point matches. Further, the sensor 221b detects tracking error signals, which causes the galvano mirror 218 to rotate and to track along the guide groove. Under such conditions, the optical head performs recording and reproducing of signals while performing focusing control and tracking control.

Figure 22:
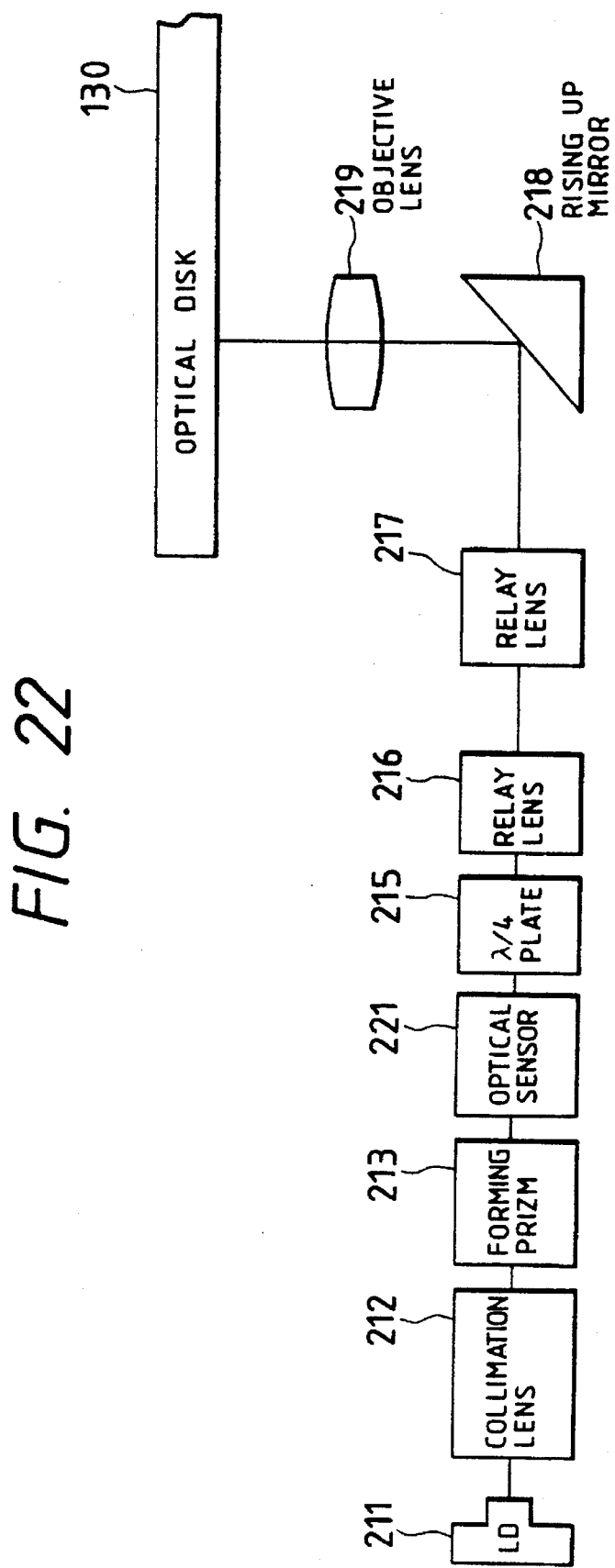
FIG. 22 is a block diagram showing one embodiment of an optical head suitable for realizing the present invention.

FIG. 22 shows an example of a thin type optical head suitable for practicing the present invention. In the conventional optical head, an actuator for driving an objective lens was included for focusing control, with the result that the thickness reduction of the optical head was difficult. In the optical head suitable for use in the present invention, the actuator for an objective lens 219 is eliminated and instead, a relay lens 216 is provided, and the focusing control is realized by shifting the relay lens parallel with the disk. Further, in an ordinary objective lens aberration on the disk is compensated by making use of a plurality of lenses, however in this case, the objective lenses are divided and a part thereof is moved in front of a rising up mirror 218 so that a thickness reduction of the optical head is achieved. Since other functions are equivalent to the conventional optical system, detailed explanation thereof is omitted.

Figure 23:
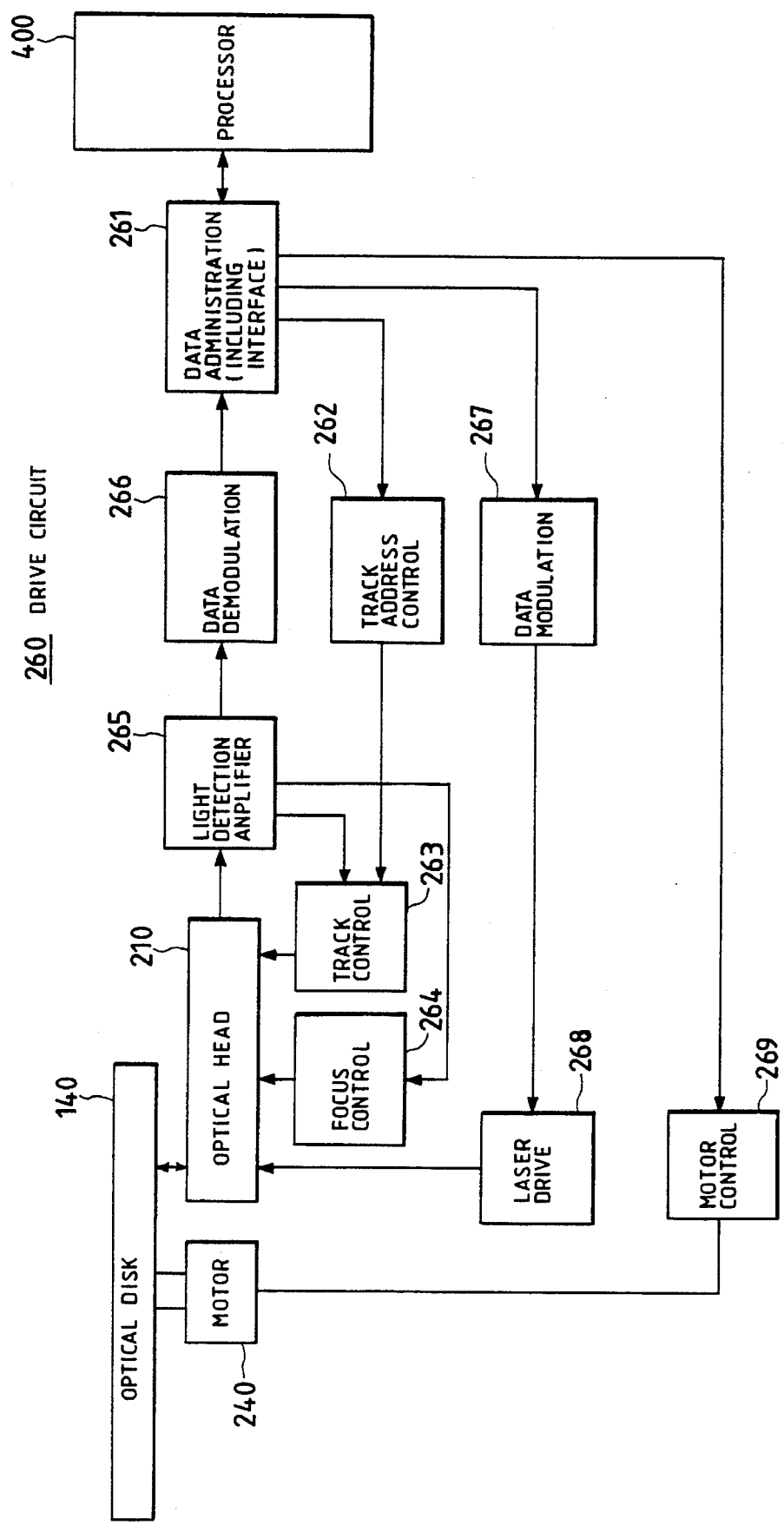
FIG. 23 is a block diagram showing one embodiment of a drive circuit system which is necessary for realizing the present invention.

FIG. 23 is for detailed explanation of the optical disk drive circuit system 260 in FIG. 9. The optical disk drive circuit system 216 is composed of a data administration unit 261, a truck address control unit 262, a truck control unit 263, a focus control unit 264, a light detection and amplification unit 265, a data demodulation unit 266, a data modulation unit 267, a laser drive 268, and a motor control unit 269. In such constitution, during overwriting, a truck address to be recorded is determined in the truck address control unit 262, and the data modulation unit 267 converts the data provided by a processor 400 into a "0"/"1" pattern to be recorded in the optical disk in accordance with the modulation method. In the modulation methods there are a 2–7 modulation and a 4–15 modulation, and these are used depending upon the systems. The laser drive 268 modulates the laser power between that for erasing and that for regarding according to the "0"/"1" pattern determined by the data modulation unit 267. Further, during data reproduction, a truck address designated by the processor 400 is selected, the laser power is maintained substantially constant at about 1 to 2 mW, the reflectivity of an optical disk 140 is read by the light detector and amplifier 265, and the data is demodulated by the data demodulation unit 266. Still further, the output of the light detector and amplifier 265 is utilized as signals for the truck control 263 and focusing control 264, however the function of the portion is realized by the function which has been used, such as in the conventional compact disk and optical disk device. Further, the motor control unit 269 controls rotational speed of the motor 240 for rotating the optical disk 140. For the rotational speed control there are a CAV (Constant Angular velocity) control type and a CLV (Constant Linear Velocity) control type.

Figure 24:
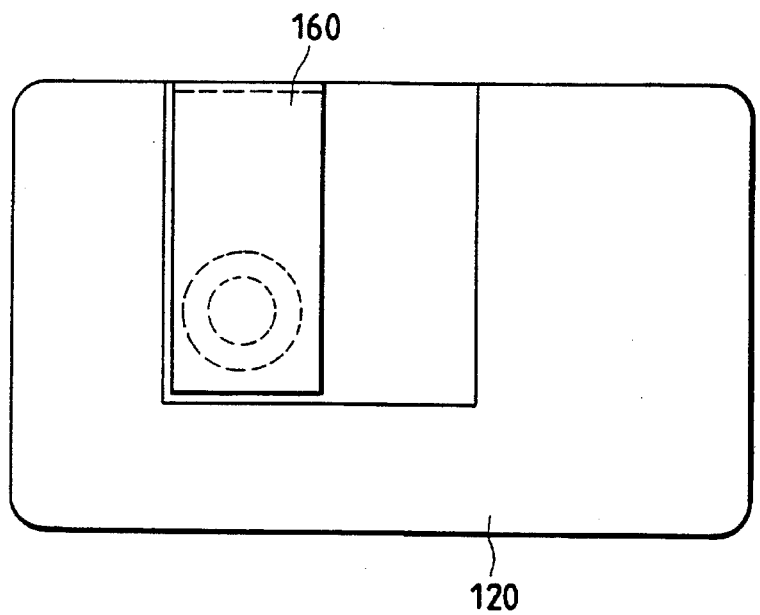
FIG. 24 is a plan view showing another embodiment of an optical disk in card.

FIG. 24 shows another embodiment of an optical-disk-in-card 100 for realizing the present invention. Although the basic constitution is the same as that shown in FIG. 7, and the light incidence part is covered by a transparent protective case, a feature of the embodiment in FIG. 24 is that a protective cover 160 is further provided. Since the optical-disk-in-card 100 of the present invention is freely carried, the card 120 is likely to be scratched. There is no problem when the card is scratched at the portion other than the light incidence part, however, when the light incident part is scratched replacement of the card case is sometimes necessitated. An object of the present invention is to decrease the number of replacements times of the card case. Namely, by providing the protective cover 160 on the card case 120, scratches on the light incidence part are protected and when the optical-disk-in-card is inserted in an optical disk drive 200 the protective cover 160 is adapted to open and permit incidence of light freely.

Figures 25A, 25B:
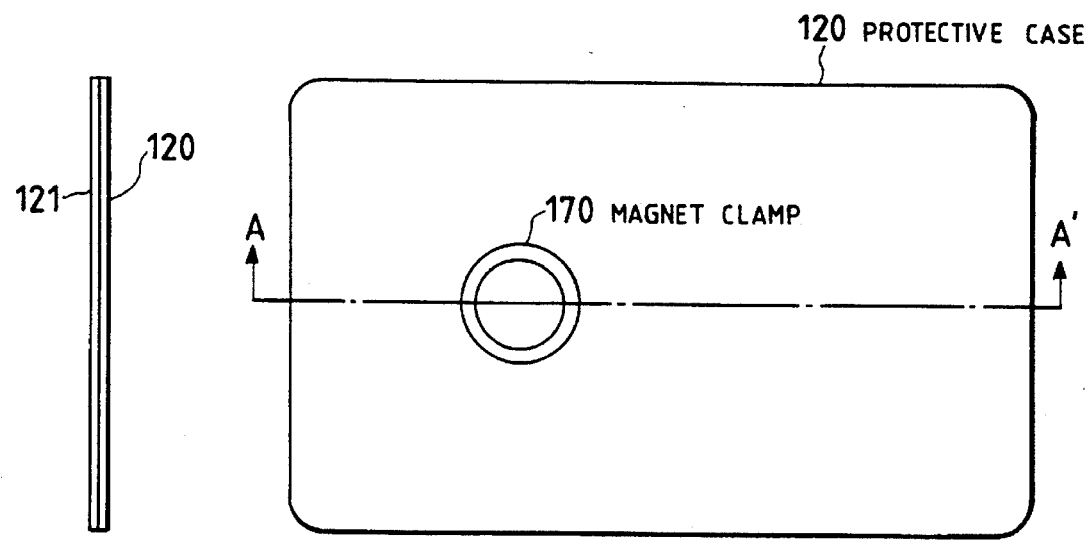
FIG. 25(a) is a plan view showing one embodiment of an optical-disk-in-card using a magnet clamp.
FIG. 25(b) and (c) are the cross-sectional views of FIG. 25(a)
Figure 25C:
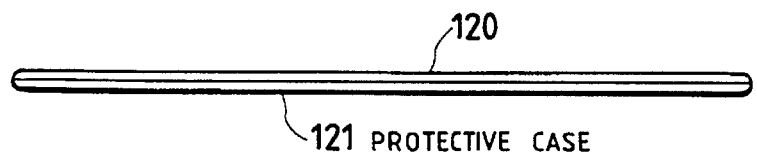
Figure 26A:
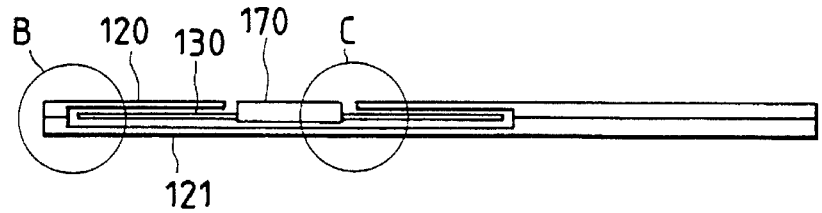
FIG. 26(a), FIG. 26(b), and FIG. 26(c) are cross-sectional views for explaining details of the optical-disk-in-card of FIG. 25.
Figure 26B:
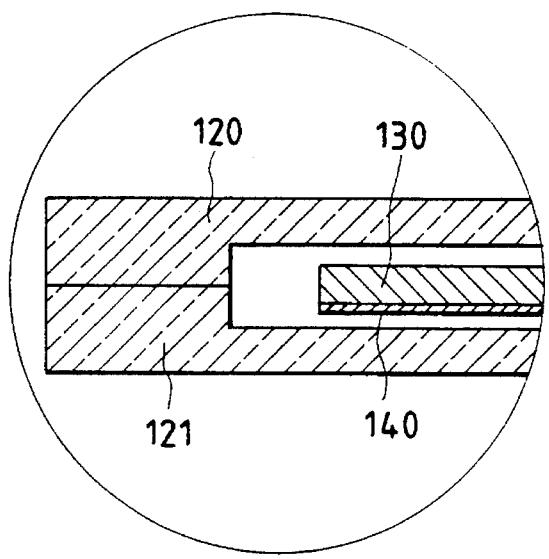
Figure 26C:
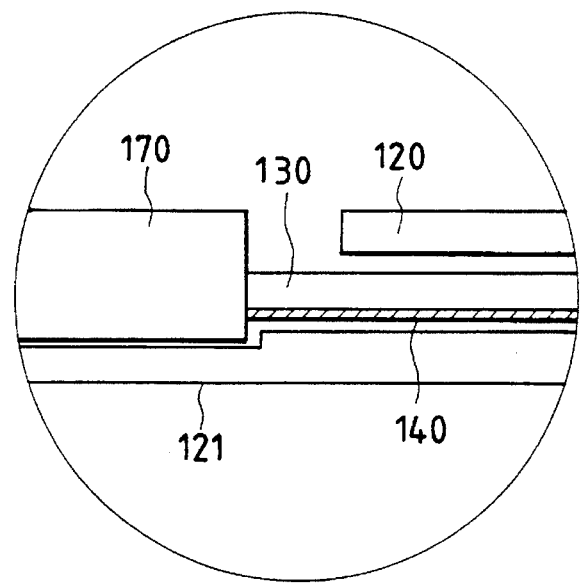

FIG. 25(a), 25(b), and 25(c) show another embodiment of the optical-disk-in card 100. FIG. 25(a) shows a plan view of the card sized optical disk with a case formed by transparent protective plate 120 and protective plate 121. The film thickness of the protective plates 120 and 121 is from about 0.5 to 1.2 mm, and an optical disk 140 (not shown) is built-in in a manner sandwiched between the protective plates 120 and 121. Further, 170 is a magnet clamp for fixing the optical disk 140 to a rotatable shaft to rotate the optical disk therewith. FIG. 26(a) shows a cross-sectional structural view of this optical disk. The optical disk 140 is fixed by the magnet clamp 170, and is spaced from the protective plates 120 and 121. Further, FIG. 26(b) shows more details of a circle B part, and FIG. 26(c) shows more details of a circle C part, in FIG. 26(a) respectively. When the optical disk is rotating, the optical disk 140 and the substrate 130 are in floating condition with respect to the protective plates 120 and 121.

Figure 27A:
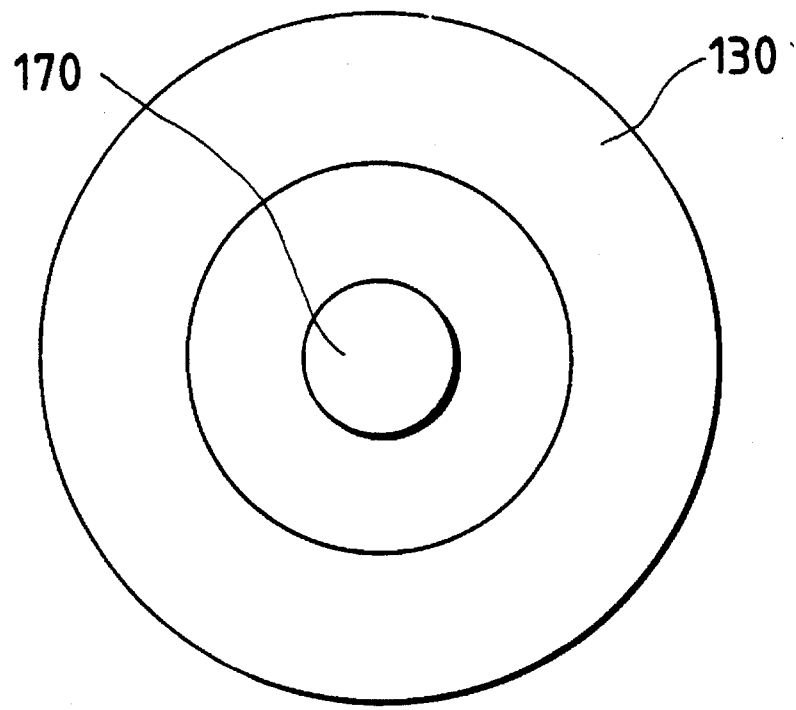
FIG. 27(a) and (b) are a plan view and cross-sectional view of an example of optical disks which is built-in inside the optical-disk-in-card of FIG. 25.
Figure 27B:
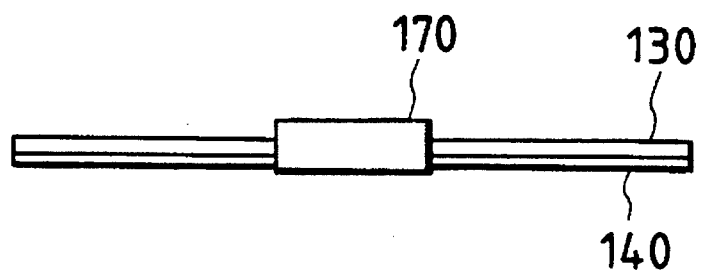

FIG. 27(a) and FIG. 27(b) show an example of an optical disk installed in the optical-disk-in-card 100. A feature of this example is that there is provided a magnet clamp 170 located at the central part for fixing the disk to the rotational shaft of the motor.

Figure 28:
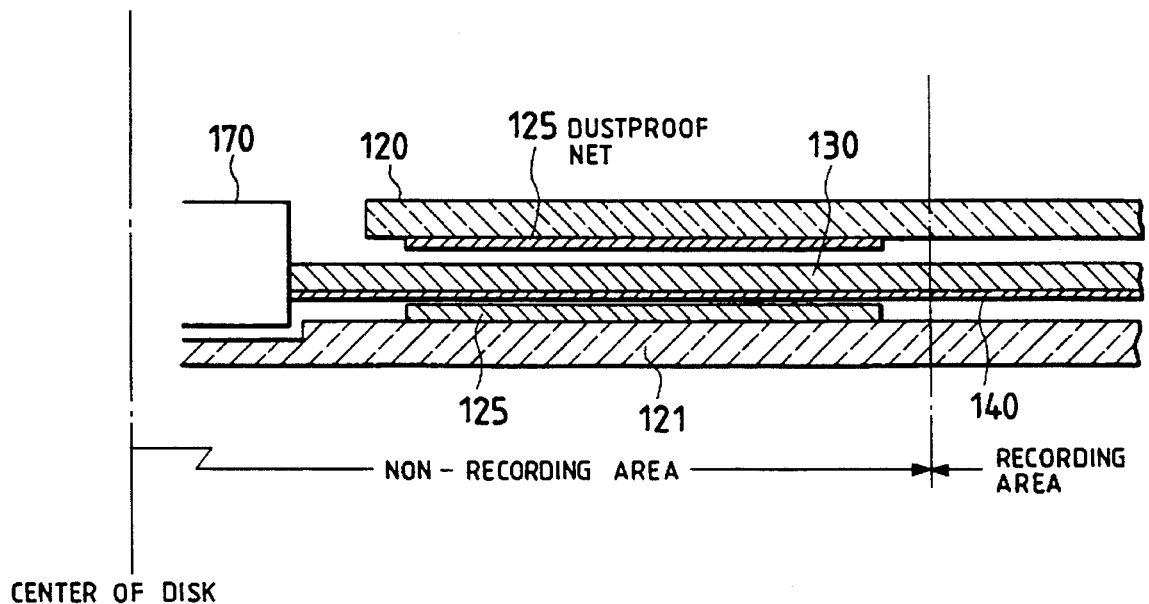
FIG. 28 is a partial cross-sectional view showing an exemplary measure for preventing rubbish and dust from slipping into a recording area in an optical disk.

FIG. 28 shows a method of preventing rubbish and dust from entering into a recording area. In the present invention, because the light incidence part is covered with a transparent cover, rubbish and dust do not enter directly in the recording area. However, because the central part of the disk is opened for rotation, rubbish and dust may enter from the central part. Therefore, in the present invention, a dustproof mat 125 is spread over a non-recording area, to prevent rubbish and dust from slipping by the central part of the disk.

Figure 29:
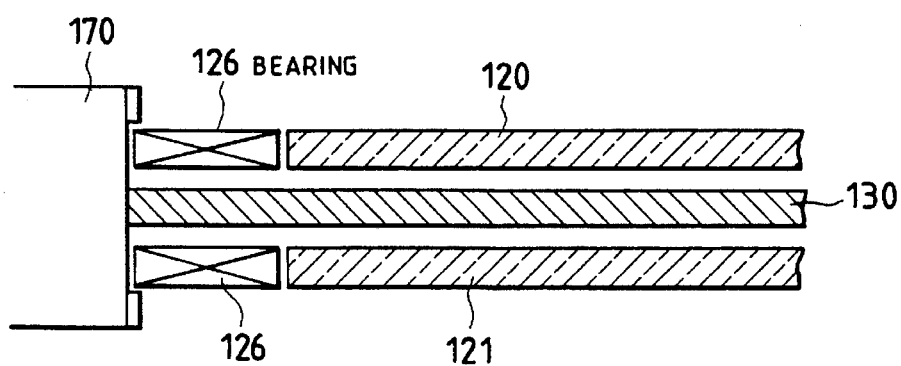
FIG. 29 is a partial cross-sectional view showing another embodiment of the exemplary measure of slip prevention.
Figures 30A, 30B, 30C:
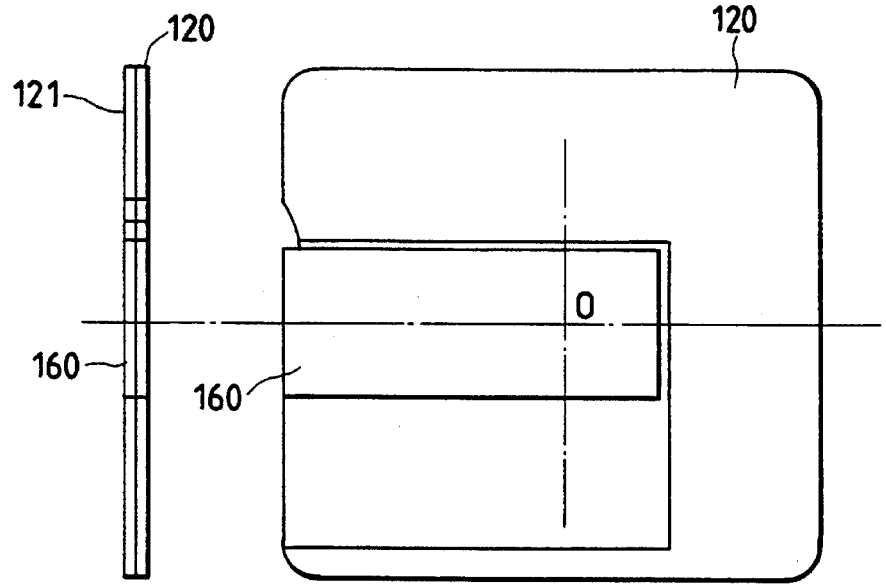
FIG. 30(a) is a plan view showing another embodiment with regard to configuration of the optical-disk-in-card.
FIG. 30(b), (c), and (d) are the cross-sectional views thereof.
Figure 30D:
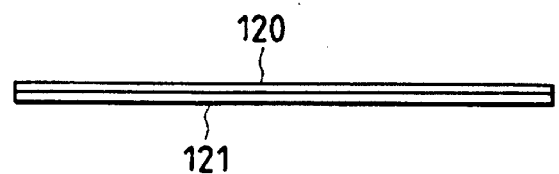

FIG. 29 shows an example of another dustproof method. in the example in FIG. 26, because the central part of the disk is opened, there was a possibility that rubbish and dust enter. On the contrary, a feature of the present embodiment is that a bearing 126 is provided at the central part of the disk to close off the opening part.

FIGS. 30(a), 30(b), 30(c), and 30(d) show another embodiment with regard to a configuration of the card in the embodiments such as in FIG. 7 and FIG. 8, although cases having a configuration equivalent to that of a credit card were explained, any configuration will do when the size of the card enables the optical disk to be mounted therein. FIG. 30 shows an example of an almost square shaped card. Further, in the present invention, an example of an optical disk having a size of about 50 mm was shown, the size can be changed when required. Namely, the present invention is applicable to optical disks of any sizes such as 12 in., 8 in., 5.25 in., 5 in., and 3.5 in., the development of which has been continuing.

Figure 31:
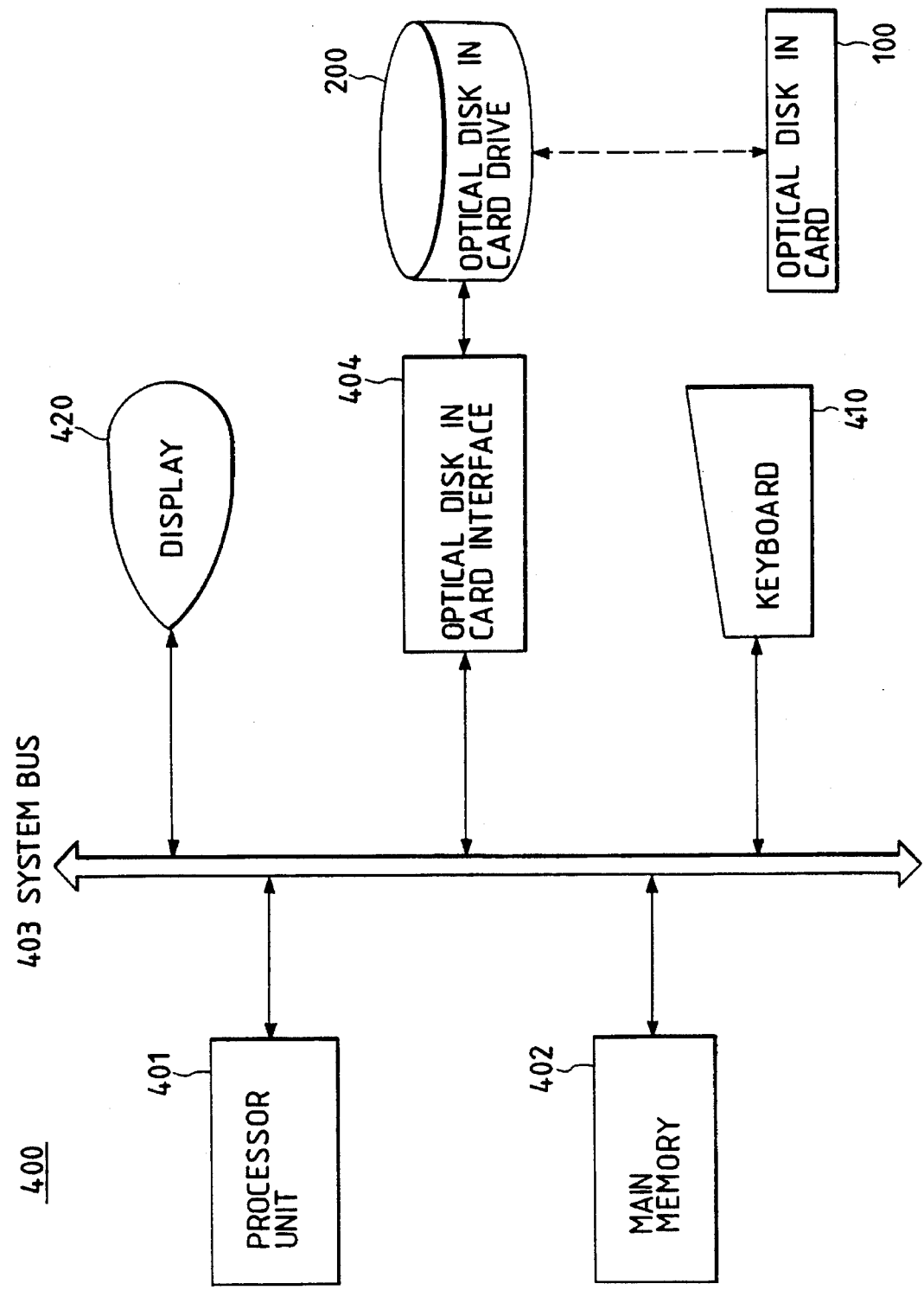
FIG. 31 is a block diagram showing an apparatus in which the optical-disk-in-card is applied to a lap top computer.
Figure 32:
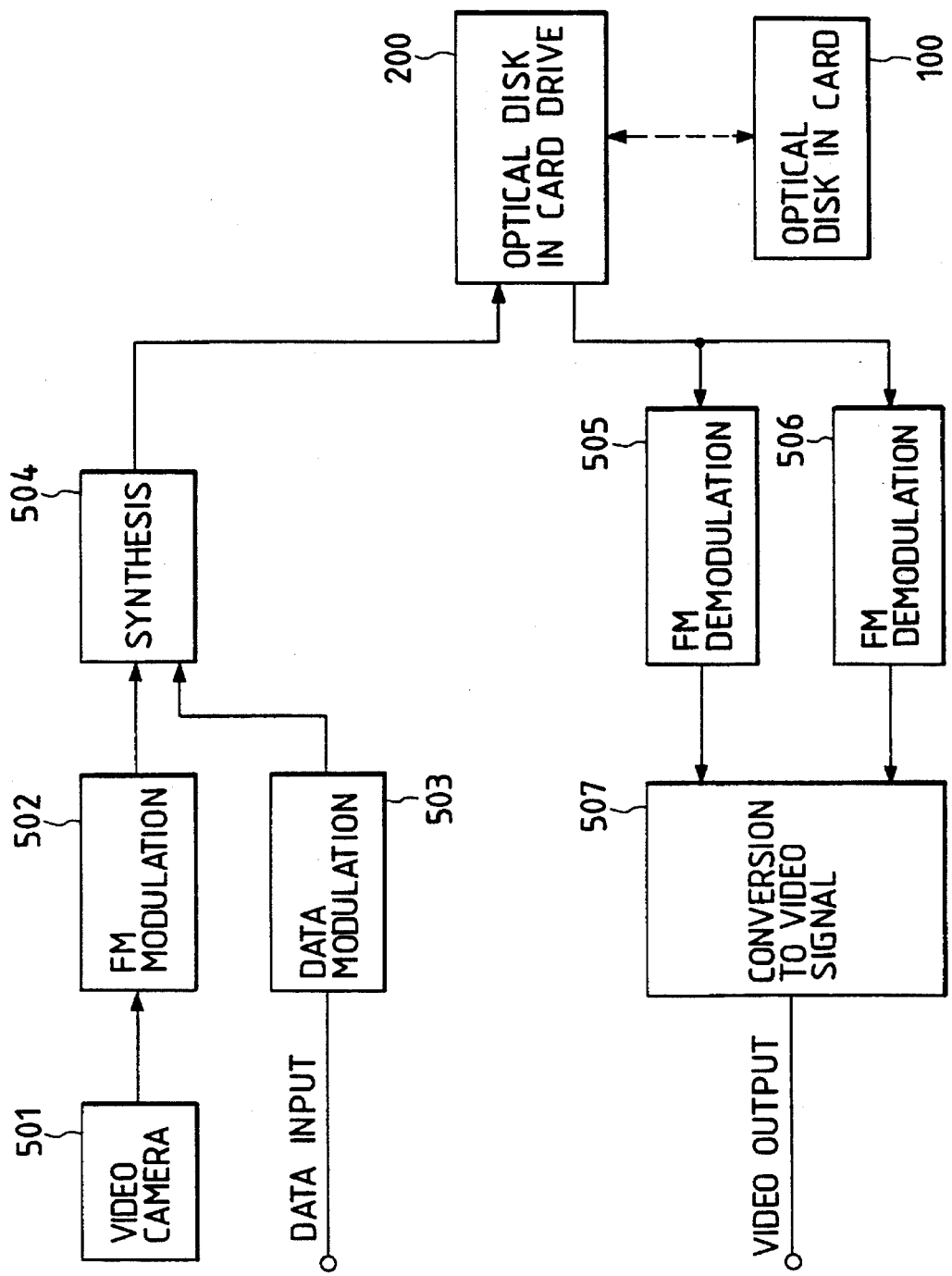
FIG. 32 is a block diagram showing an apparatus in which the optical-disk-in-card to a still camera.

FIG. 31 shows one embodiment in which the present invention is applied to a lap top computer. The lap top computer 400 is constituted of a processor unit 401 and a main memory 402, and a keyboard 410 and a display 420 are connected through a system bus 403. A feature of the present invention is that an optical-disk-in-card drive 200 is further connected through an optical-disk-in-card interface 404. Although an optical-disk-in-card 100 of the present invention is small in its outer shape such as of about 50 mm, its memory capacity is large such as to about 50 MB, thereby, the present lap top computer can perform a large scale calculation processing comparable to a minicomputer even though it is in the form of a lap top computer. Further, the optical-disk-in-card 100 is detachable from the drive 200 which constitutes a convenient system for carrying. FIG. 32 shows an embodiment in which the present invention is applied to a camera. The basic signal processing can utilize the signal processing of an electronic still camera utilizing a floppy-disk. The signal processing of the electronic still camera, as disclosed in Nikkei Electronics 12. Dec. 1988 on pp. 195–201 is constituted of a FM modulation element for picture image, a modulation element of data such as date information, a recording unit to a floppy-disk, and a video signal reproducing unit. A feature of the present invention is that an optical-disk-in-card 100 is utilized as a recording medium for signals. The optical-disk-in-card 100 of the present invention not only has a large capacity, but also is easy to handle and is highly reliable because the optical disk is built-in inside the transparent protective card. The specific operation is explained with reference to the drawing. In the drawing, electric signals which have been photoelectric-converted with a solid image pick-up element 501 such as CCD and MOS are FM modulated. On one hand, data, such as date information, is modulated by a modulation method, such as DPSK (differential phase shift keying), is combined with FM modulation (block 504), and recorded in the optical-disk-in-card 100 through the optical-disk-in-card drive 200. On the other hand, during reproduction, the image is demodulated by a FM demodulator 505, and data is obtained by a data demodulator 506, respectively, and is converted into video signals, such as NTSC signals, by a converter 507 for video signals.

Figure 33:
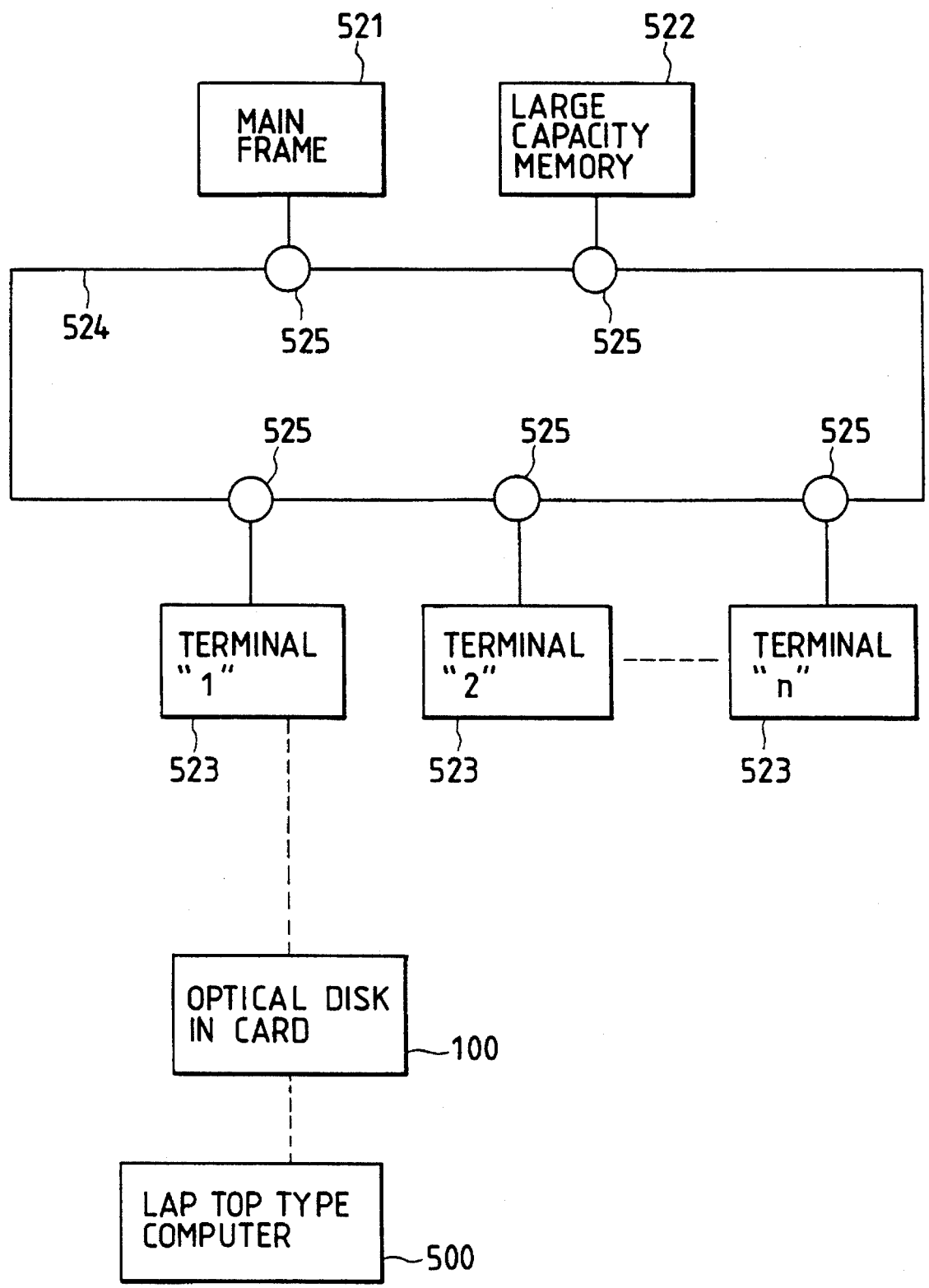
FIG. 33 is a block diagram showing an apparatus in which the optical-disk-in-card a memory for an interface between terminals of a large computer and a lap top computer.

FIG. 33 shows an example in which the optical-disk-in-card 100 is utilized as an interface between a lap top computer 500 and the terminal 523 of a large scaled computer 521. In the drawing, the large scaled computer-521 usually includes a memory 522 with a large capacity such as a magnetic disk, and is used from a lot of the terminals 523 connected through a network 524 and a station 525. However, there was a problem that such system could not be utilized at places where there were no terminals. The present invention solves such problem, in that, the optical-disk-in-card 100 of the present invention is used for a lap top type computer 500, and the optical-disk-in-card 100 of the present invention is used additionally as a memory of the terminal 523 of the large scaled computer. Namely, by using in common the optical-disk-in-card 100 for the lap top computer 500 and the memory of the terminal of the large scaled computer, preparation of programs and debug work are carried out at places where there are no terminals, such as homes and trains.

Figure 34:
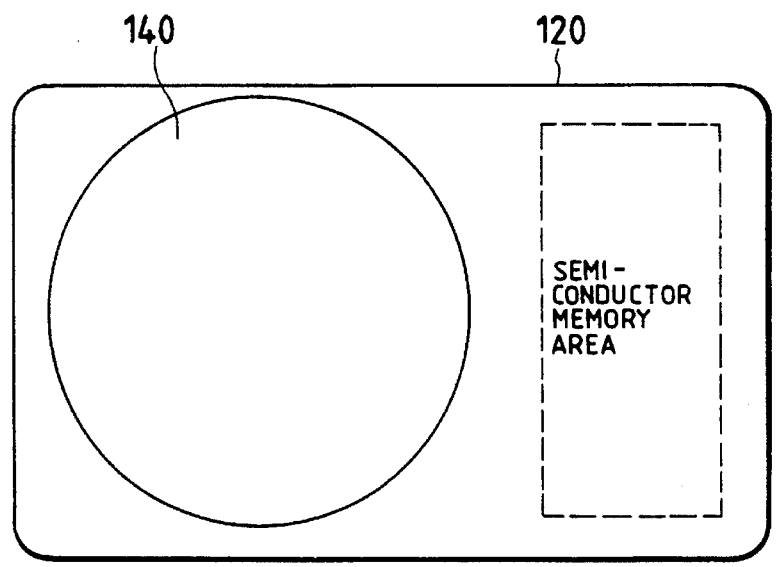
FIG. 34 is a plan view showing an example of an optical-disk-in-card with a semiconductor memory which enhances security.

FIG. 34 shows an application example of the optical-disk-in-card 100 in which security for the memory is requested. The optical disk 140 is characterized by its large capacity, however by using a microscope with a large magnification, the recorded data pattern can be examined. By utilizing a random number code, not only will security be obtained, but also a higher security becomes available by mounting a semiconductor memory on the card. This case is achieved by providing semiconductor area "A" as shown in FIG. 34. When such higher security is achieved, the optical-disk-in-card 100 can be employed as a cash card and a portable data base for information which requires confidentiality such as, medical data of individuals. The case is realized by the hardware constitution shown in FIG. 9.

Figure 35:
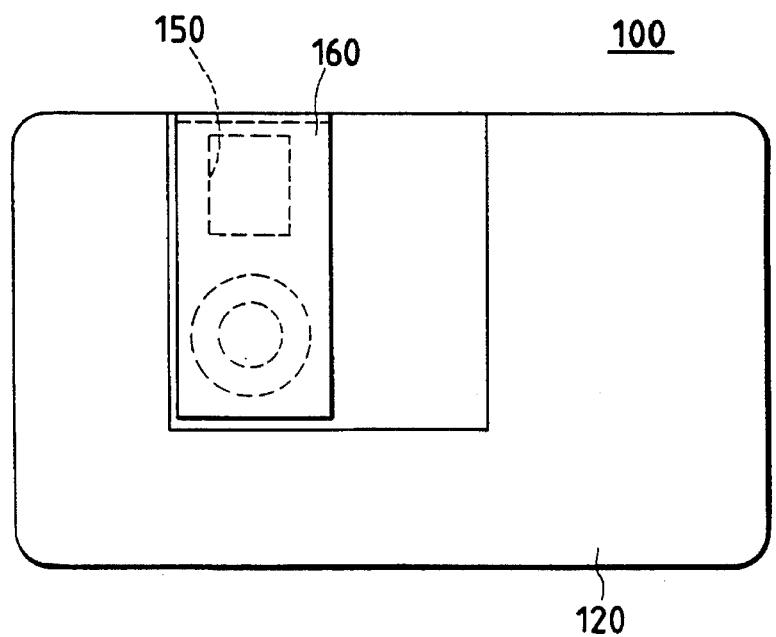
FIG. 35 is a plan view of another embodiment of the optical-disk-in-card of the present invention.
Figure 36A:
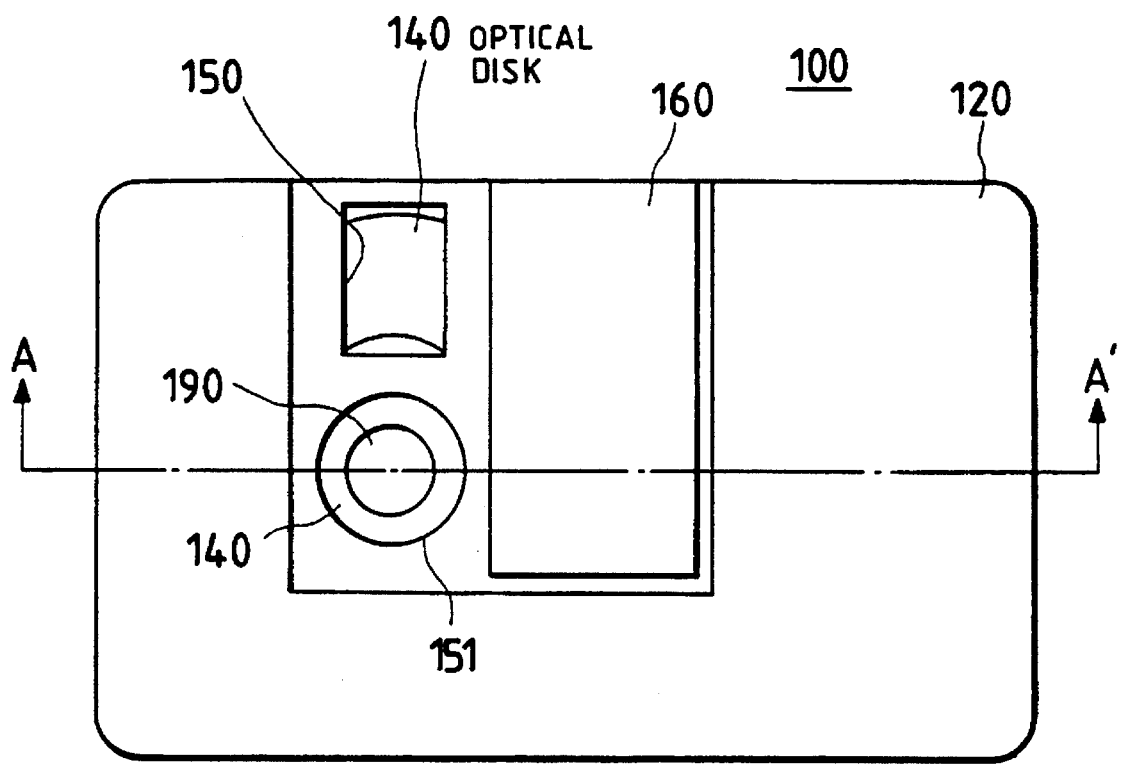
FIG. 36(a) is a plan view showing an outlook of the optical-disk-in-card in FIG. 35 when the window cover is opened.
Figure 36B:
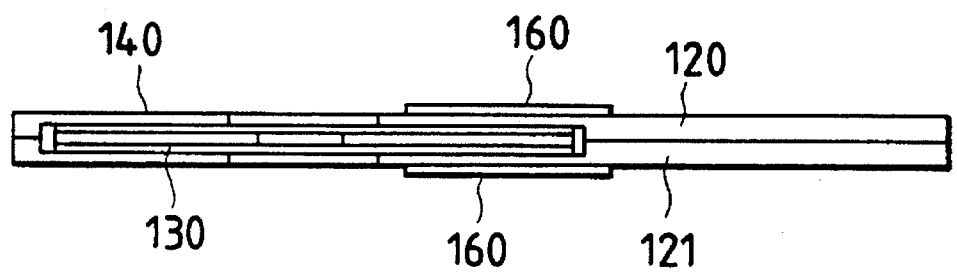
FIG. 36(b) is a cross-sectional view thereof.

FIG. 35 shows another embodiment of the optical-disk-in-card 100 suitable for realizing the present invention. As shown in the drawing, in the present optical-disk-in-card 100, an optical disk medium 140 is accommodated inside card size protective cases 120 and 121. Further, in the protective case, a window 150 for the light incidence is provided, and usually the optical disk is covered by a cover 160. Herein, when the optical-disk-in-card 100 is set in a drive 200, a shutter 160 of the protective case is opened, the light is impinged directly to the substrate for the optical disk, and, in the case of the optical disk, a magnetic field generating means is adapted to be used close to the optical disk. FIG. 36 is a view of the optical-disk-in-card 100 when the window cover 160 is opened, and when the window cover 160 is opened, the optical disk 140 is exposed and the optical head accesses the optical disk directly.

What is claimed is:

1. An information processing device comprising:

an optical head which is operable with any one of a ROM type, a write-once type and a rewritable type optical disk wherein each optical disk includes a disk optical memory medium for optically recording information which is rotatably received in a case, said case for each optical disk memory being of the same size, and each disk optical memory medium having a thickness of no more than 1 mm and a reflectivity of not more than 60% for recording and reproducing information to and from said optical disk;

means for accommodating any one of said ROM type, write-once type and rewritable type optical disks in a predetermined positional relationship for processing with respect to said optical head;

rotating means for rotating any one of said ROM type, write-once type, and rewritable type optical disks;

a drive circuit for controlling operation of said optical head and rotational speed of said rotating means;

a processor for providing command signals to said drive circuit;

input means for inputting information to said processor; and output means for outputting information from said processor.

2. An information processing device for use with any one of a ROM type optical disk memory, a write-once type optical disk memory and a rewritable type optical disk memory, wherein each optical disk memory includes a disk type optical memory medium for optically recording information which is rotatably received in a case, said disk type optical disk memory medium having a thickness of no more than 1 mm, said case for each optical disk memory being of the same size, said write-once type and rewritable type optical disk memories having substantially the same reflectivity as that of said ROM type optical disk memory which has a reflectivity of not more than 60%, said information processing device comprising:

rotating means for rotating any one of said ROM type, write-once type and rewritable type optical disk memories;

an optical head for reproducing the information recorded in said ROM type, write-once type and rewritable type optical disk memories, and for recording information in said write-once type and rewritable type optical disk memories;

rotating means for rotating any one of said ROM type, write-once type, and rewritable type optical disk memories;

a drive circuit for controlling operation of said optical head and rotational speed of said rotating means;

a processor for providing command signals to said drive circuit;

input means for inputting information to said processor; and output means for outputting information from said processor.

3. An information processing device according to claim 2, wherein said write-once type optical disk memory comprises any one of Te, cyanin series and naphthalo-cyanin series.

4. An information processing device according to claim 2, wherein said rewritable type optical disk memory comprises any one of In—Sb—Te series, Ge—Sb—Te series, In—Sb series, Te—Fe—Co series and Cd—Fe—Co series.

5. A ROM type optical disk memory storing information in pits on a recording surface thereof, said recording surface having a reflectivity which is not more than 60%.

6. A ROM type optical disk memory, comprising:

a disk shaped substrate; and a reflective film disposed upon said substrate, wherein information is stored in pits on a surface of said substrate, and wherein further said reflective film has a reflectivity which has a value in the range of 30%–60%.

7. A ROM type optical disk memory according to claim 6, further comprising a case for rotatably receiving said substrate.

8. A ROM type optical disk memory according to claim 6, wherein said substrate is transparent and said reflective film is at least one of a metallic film and a dielectric film.

9. A ROM type optical disk memory according to claim 6, wherein said substrate is a metallic substrate, and said ROM type optical disk memory further comprises a transparent protective film disposed on said reflective film.

10. A ROM type optical disk memory according to claim 6, wherein said substrate is a non-transparent organic substrate, and said ROM type optical disk memory further comprises a transparent protective film disposed on said reflective film.

11. A ROM type optical disk memory according to claim 6, wherein said substrate includes either guide grooves or wobble pits for following a track thereof.

12. A ROM type optical disk memory having a disk type optical memory medium for optically recording information and being rotatably received in a case, said disk type optical memory medium storing information in pits on a recording surface thereof said ROM type optical disk memory medium having a reflectivity which is not more than 60% and information being reproduced thereon by emitting light from a light source through a transparent portion of said case onto said ROM type optical disk memory medium, and wherein an anti-reflection coating being formed on at least one of a surface of said transparent portion of said case facing said light source and a surface of said transparent portion of said case at said disk type optical memory medium side, and on a surface of said disk type optical memory medium at the side of said transparent portion of said case.

13. A ROM type optical disk memory having a disk type optical memory medium for optically recording information, said disk type optical memory medium including a substrate and at least a recording film, wherein a reflective film and an interference film are disposed on superimposed layers on said substrate, wherein said interface film has a reflectivity which is not more than 60%.

14. A ROM type optical disk memory according to claim 13, wherein said recording film is disposed between said reflective film and said substrate.

15. A ROM type optical disk memory according to claim 13, wherein said reflective film is disposed between said substrate and said recording film.

16. A ROM type optical disk memory according to claim 13, wherein interference film is disposed on both sides of said recording film.

17. A ROM type optical disk memory according to claim 13, wherein said ROM type optical disk memory is rotatably received in a case.

18. A ROM type optical disk memory, comprising:

a disk shaped substrate; and a reflective film disposed upon said substrate, wherein information is stored in pits on a surface of said substrate, and wherein further said reflective film has a reflectivity which has a value in the range of 10%–45%.

19. A ROM type optical disk memory according to claim 18, further comprising a case for rotatably receiving said substrate.

20. A ROM type optical disk memory according to claim 18, wherein said substrate is transparent and said reflective film is at least one of a metallic film and a dielectric film.

21. A ROM type optical disk memory according to claim 18, wherein said substrate is a metallic substrate, and said ROM type optical disk memory further comprises a transparent protective film disposed on said reflective film.

22. A ROM type optical disk memory according to claim 18, wherein said substrate is a non-transparent organic substrate, and said ROM type optical disk memory further comprises a transparent protective film disposed on said reflective film.

23. A ROM type optical disk memory according to claim 18, wherein said substrate includes either guide grooves or wobble pits for following a track thereof.

24. A ROM type optical disk memory for recording information having a reflectivity which is not more than 60%, comprising:

a transparent substrate;

an interference layer having a larger refractive index than a refractive index of said transparent substrate; and a reflective layer having a plurality of pits on a surface thereof for storing said information;

wherein an incident light path sequentially follows said transparent substrate and said interference layer, and wherein further a reflecting light reflected by said reflective layer is sequentially reflected back to said interference layer and said transparent substrate.

25. A ROM type optical disk memory according to claim 24, wherein said interference layer includes at least one of ZnS, $Si_3N_4$, $Al_2O_3$, AlN, and $Ta_2O_5$.

26. A ROM type optical disk memory according to claim 25, wherein said reflective layer contains at least one of Au, Al, Ni—Cr.

27. A ROM type optical disk memory according to claim 26, wherein said transparent substrate comprises at least one of glass and polycarbonate.

28. A ROM type optical disk memory according to claim 26, wherein a thickness of said reflective layer is not more than 100 nm.

29. A ROM type optical disk memory, comprising:

a disk shaped substrate; and a reflective film disposed upon said substrate, wherein information is stored in pits on a surface of said substrate, and wherein further said reflective film has a reflectivity which is not more than 60%.

30. A ROM type optical disk memory according to claim 29, further comprising a case for rotatably receiving said substrate.

31. A ROM type optical disk memory according to claim 29, wherein said substrate is transparent and said reflective film is at least one of a metallic film and dielectric film.

32. A ROM type optical disk memory according to claim 31, wherein said reflective film includes Ni—Cr.

33. A ROM type optical disk memory according to claim 29, wherein said substrate is a non-transparent organic substrate, and said ROM type optical disk memory further comprises a transparent protective film disposed on said reflective film.

34. A ROM type optical disk memory according to claim 29, wherein said substrate includes either guide grooves or wobble pits for following a track thereof.

35. A ROM type optical disk memory according to either of claims 6 and 33, wherein said disk type optical memory medium includes at least one interference film having a reflectivity which is not more than 60%.

36. A ROM type optical disk memory according to claim 29, wherein said substrate is a metallic substrate, and said ROM type optical disk memory further comprises a transparent protective film disposed on said reflective film.

* * * * *